United States Patent
McHenry et al.

(10) Patent No.: US 8,914,266 B2
(45) Date of Patent: Dec. 16, 2014

(54) SYSTEMS AND METHODS FOR MODELING FLOODS

(75) Inventors: John N. McHenry, Raleigh, NC (US); Carlie J. Coats, Chapel, NC (US)

(73) Assignee: Baron Service, Inc., Huntsville, AL (US)

(*) Notice: Subject to any disclaimer, the term of this patent is extended or adjusted under 35 U.S.C. 154(b) by 197 days.

(21) Appl. No.: 13/167,470

(22) Filed: Jun. 23, 2011

(65) Prior Publication Data
US 2012/0053917 A1 Mar. 1, 2012

Related U.S. Application Data

(60) Provisional application No. 61/357,723, filed on Jun. 23, 2010.

(51) Int. Cl.
G06G 7/50 (2006.01)
G06F 17/50 (2006.01)

(52) U.S. Cl.
CPC ........ *G06F 17/5009* (2013.01); *G06F 2217/16* (2013.01)
USPC ................................................. 703/9; 702/3

(58) Field of Classification Search
USPC ....................................................... 703/9, 10
See application file for complete search history.

(56) References Cited

U.S. PATENT DOCUMENTS

| | | | | |
|---|---|---|---|---|
| 6,947,842 B2 * | 9/2005 | Smith et al. | ......... | 702/3 |
| 7,039,565 B1 * | 5/2006 | Jin et al. | ......... | 703/2 |
| 7,136,756 B1 * | 11/2006 | Vieux et al. | ......... | 702/5 |
| 7,277,837 B2 * | 10/2007 | Minton, Jr. | ......... | 703/6 |
| 7,627,491 B2 * | 12/2009 | Feyen et al. | ......... | 705/4 |
| 7,917,292 B1 * | 3/2011 | Du | ......... | 702/5 |
| 2005/0273300 A1 * | 12/2005 | Patwardhan et al. | ......... | 703/9 |

OTHER PUBLICATIONS

Arnold, et al. "A comprehensive surface-groundwater flow model", Journal of Hydrology, 142 (1993), pp. 47-69.*
Dutta, et al. "A mathematical model for flood loss estimation", Journal of Hydrology 277 (2003), pp. 24-49.*
Arnold, et al. "Large Area Hydrologic Modeling and Assessment Part I: Model Development", Journal of the American Water Resources Association, vol. 34, No. 1, Feb. 1998, pp. 73-89.*

(Continued)

*Primary Examiner* — Mary C Jacob
(74) *Attorney, Agent, or Firm* — Maynard Cooper & Gale, P.C.; Jon E. Holland

(57) ABSTRACT

A flood modeling system defines virtual cells of a geographic region. Some of the cells, referred to as "channel cells," represent areas within a channel for a moving body of water, such as a stream or river. Other cells, referred to as "land cells," represent areas external to the channels within the geographic region. The flow of water through the geographic region is modeled as a virtual flow of water through the channel cells and the land cells. For each time step, the system calculates the amount of water that virtually flows out of one cell into adjacent cells. The water estimated to virtually flow above ground represents flood water, and the estimates of such water can be used to generate an inundation map or initiate flood warnings.

26 Claims, 16 Drawing Sheets

(56) References Cited

OTHER PUBLICATIONS

Aronica, et al. "Uncertainty and equifinality in calibrating distributed roughness coefficients in a flood propagation model with limited data", Advances in Water Resources vol. 22, No. 4, pp. 349-365, 1998.*

Mason, et al. "Floodplain friction parameterization in two-dimensional river flood models using vegetation heights derived from airborne scanning laser altimetry", Hydrol. Process. 17, pp. 1711-1732 (2003).*

Cobby, et al. "Image processing of airborne scanning laser altimetry data for improved river flood modelling", ISPRS Journal of Photogrammetry & Remote Sensing 56 (2001), pp. 121-138.*

Dutta et al, "Flood Inundation Simulation in a River Basin Using a Physically Based Distributed Hydrologic Model", Hydrological Processes, 14, pp. 497-519, 2000.*

Harbaugh, Arlen, "USGS MODFLOW—2005, The US Geological Survey Modular Ground-Water Model—The Ground Water Flow Process", U.S. Geological Survey Techniques and Methods 6-A16.*

Panday et al, "A Fully Coupled Physically Based Spatially Distributed Model for Evaluating Surface/Subsurface Flow", Advances in Water Resources 27, pp. 361-382, 2004.*

Querner, E. P., "Description and Application of the Combined Surface and Groundwater Flow Model MODGROW", Journal of Hydrology 192, pp. 158-188, 1997.*

\* cited by examiner

SYSTEMS AND METHODS FOR MODELING FLOODS

CROSS REFERENCE TO RELATED APPLICATION

This application claims priority to U.S. Provisional Application No. 61/357,723, entitled "Systems and Methods for Modeling Floods" and filed on Jun. 23, 2010, which is incorporated herein by reference.

RELATED ART

An inundation map is a geographical map indicating areas flooded or likely to be flooded due to receiving an inundation of water, such as from rain, a dam bursting, a tsunami, a storm surge, or the like. Such maps are useful for providing flood warnings and helping individuals to plan for or avoid the effects of a flooding event. However, accurately predicting which geographic areas will flood and the severity of floods can be difficult and problematic potentially limiting the effectiveness and usefulness of inundation maps.

The difficulty of predicting flooding is pronounced when a flowing body of water, such as a stream or river, is a source of flooding. In this regard, models for estimating or predicting rainfall have become very sophisticated and accurate, driven in large part to the public's need for weather forecasting. Thus, the amount of water accumulating over a given area due to rainfall, in many cases, can be predicted with a relatively high degree of accuracy. However, current techniques for estimating the amount of water that overflows the banks of a stream or river are much less accurate. Indeed, during a flood, water often flows both out of and into a stream or river in differing amounts depending on many factors, including differences in terrain, water levels, flow velocities, slopes, and other factors. Estimating and modeling the flow of water out of and around a stream or river can be very difficult and fraught with errors. Further, any estimation errors in water accumulation in one part of a stream or river have an effect on the estimates downstream such that errors may accumulate downstream in any model used to generate an inundation map. Thus, it can be extremely difficult to generate a reliable inundation map when the flooded area is affected by the presence of water from a stream or river, yet streams and rivers typically contribute significantly to many devastating or dangerous floods for which accurate inundation maps are highly desired.

Accordingly, a heretofore unaddressed need exists in the art for systems and methods for accurately predicting floods or estimating floods in real-time, particularly in areas that are affected by flowing bodies of water, such as streams or rivers.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for modeling floods. A flood modeling system in accordance with one exemplary embodiment of the present disclosure defines cells, which virtually represents different areas of a geographic region. Some of the cells, referred to as "channel cells," represent areas within a channel for a moving body of water, such as a stream or river. Other cells, referred to as "land cells," represent areas external to the channels within the geographic region. The flow of water through the geographic region is modeled as a virtual flow of water through the channel cells and the land cells. The virtual flow of water through the channel cells is modeled via one algorithm, referred to as a "channel flow algorithm," and the virtual flow of water through the land cells is modeled via another algorithm, referred to as a "land flow algorithm."

The virtual flow of water over time is estimated in a series of time steps in which each time step represents a specified period of time. For each time step, the system calculates the amount of water that virtually flows out of one cell into adjacent cells. Thus, for any given time step, each cell has an estimated amount of water virtually contained within the cell. For land cells, some of the water is estimated to virtually flow above ground, and some of the water is estimated to virtually flow below ground (i.e., subterranean). The water estimated to virtually flow above ground represents flood water and can be quantified for each cell. Thus, data indicative of the amount of water estimated to be above ground for the land cells can be used to generate an inundation map or for other purposes, such as initiating flood warnings for areas that are modeled to experience or predicted to experience a significant amount of flooding.

Figure 1:
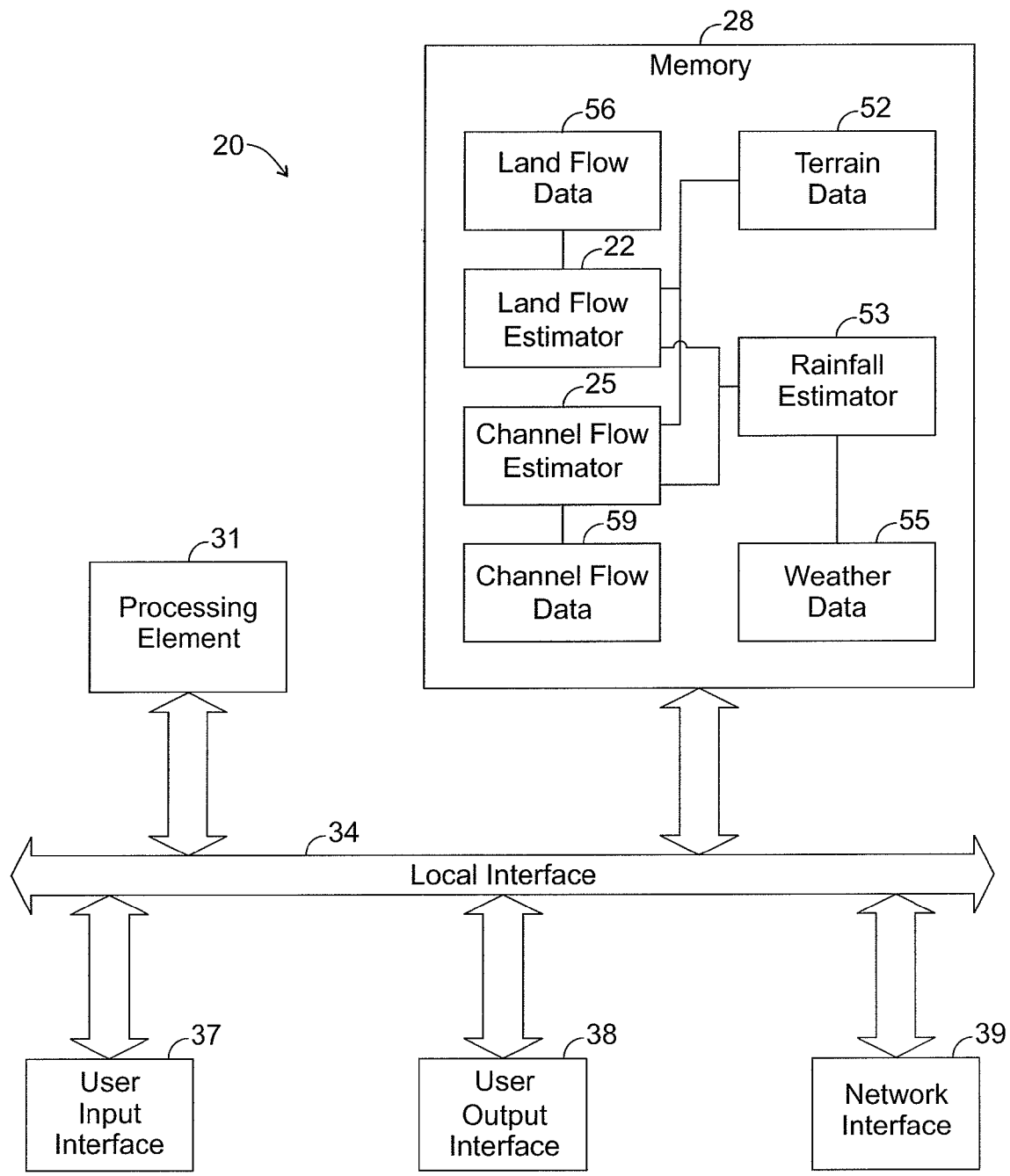
FIG. 1 is a block diagram illustrating an exemplary flood modeling system.

FIG. 1 depicts an exemplary embodiment of a flood modeling system 20. As shown by FIG. 1, the system 20 comprises a land flow estimator 22 and a channel flow estimator 25. The land flow estimator 22 is configured to estimate the virtual flow of water through land cells and to calculate the amount of water virtually contained within each land cell for each time step. The channel flow estimator 25 is configured to estimate the virtual flow of water through channel cells and to calculate the amount of water virtually contained within each channel cell for each time step.

It should be noted that the land flow estimator 22 and the channel flow estimator 25 can be implemented in software, hardware, firmware or any combination thereof. In the exemplary embodiment illustrated in FIG. 1, the land flow estimator 22 and the channel flow estimator 25 are implemented in software and stored in memory 28 of the flood modeling system 20.

Note that the land flow estimator 22 and/or the channel flow estimator 25, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the flood modeling system 20 depicted by FIG. 1 comprises at least one conventional processing element 31, such as a digital signal processor (DSP) or a central processing unit (CPU), that communicates to and drives the other elements within the system 20 via a local interface 34, which can include at least one bus. Furthermore, a user input interface 37, for example, a keyboard or a mouse, can be used to input data from a user of the system 20, and a user output device 38, such as a display device (e.g., a liquid crystal display (LCD) or a printer), can be used to output data to the user. Further, a network interface 39 enables the system 20 to exchange data with a network, such as the Internet.

As shown by FIG. 1, terrain data 52 is stored in memory 28. The terrain data 52 is indicative of a geographic region, which may include a channel, such as a stream or river bed, through which water may flow. In this regard, the terrain data 52 defines a virtual model of the terrain in a geographic region. In one exemplary embodiment, the virtual model includes land cells and channel cells. The channel cells represent areas within a channel of the geographic region, such as a stream or river bed, through which water may flow. The land cells represent areas of the geographic region external to the channels represented by the channel cells.

Figure 2:
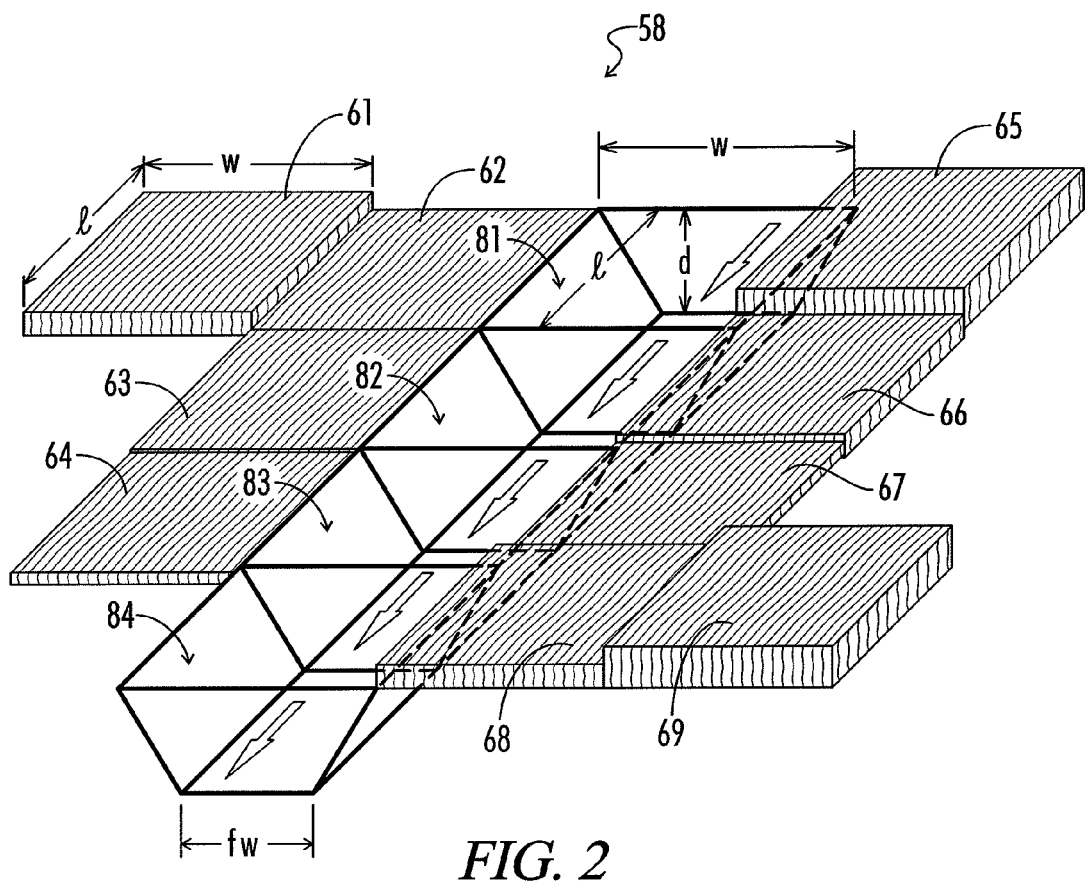
FIG. 2 is a diagram illustrating a graphical representation of an exemplary terrain model having land cells and channel cells representing a geographic region.

To facilitate a better understanding of the present disclosure, FIG. 2 depicts a graphical representation of an exemplary terrain model 58 having land cells 61-69 and channel cells 81-84 representing an exemplary geographic region. Note that it is unnecessary for the graphical representation to actually be displayed by the system 20. In one exemplary embodiment, each land cell 61-69 corresponds to a respective area of the geographic region.

For each land cell 61-69, the terrain data 52 defines various parameters, referred to hereafter as "terrain parameters," indicative of the characteristics of the geographic area represented by the land cell 61-69. In one exemplary embodiment, the terrain parameters include a height, a saturation indicator, an absorption indicator, a surface flow resistance indicator, a subterranean flow resistance indicator, a surface water indicator, a water surface height, and a subterranean water indicator. The foregoing terrain parameters will be described in more detail below, but it should be emphasized that other types of terrain parameters may be used in other embodiments.

The height of each land cell 61-69 refers to the average surface height of the terrain represented the land cell 61-69. Note that all heights used in the system are relative to the same reference, such as sea level. If the height of one land cell 61-69 is greater than the height of an adjacent land cell, then water generally flows from the cell having the greater height to the cell having the smaller height. Such behavior generally mimics the real world behavior of water flowing downhill. However, as will be described in more detail hereafter, in flooding conditions, it is possible for water to virtually flow from a cell having a smaller height to a cell having a greater height, depending on the extent of the flooding.

The rate that water virtually flows from one cell to another is dependent on several factors, such as the amount of water virtually contained in the cells, the flow resistances for the cells, and the slope between the cells. The slope refers to the difference in the height of one cell to another. Generally, the greater the slope, the greater is the rate at which water virtually flows from the higher cell (i.e., the cell having the greater height) to the lower cell (i.e., the cell having the smaller height). Such behavior mimics the real world behavior of water traveling faster when flowing down a hill of greater slope.

In the exemplary terrain model 58 of FIG. 2, the land cell 61 has a height greater than the land cell 62. Further, the land cell 62 has a height greater than the land cell 63, which has a height greater than the land cell 64. In addition, the land cell 65 has a height greater than the heights of the land cell 62 and the land cell 66, and the height of the land cell 66 is greater than the heights of the land cells 63 and 67. Further, the height of the land cell 67 is equal to the height of the land cell 64 but less than the height of the land cell 68, and the height of the land cell 68 is less than the height of the land cell 69.

The saturation indicator of each land cell 61-69 is indicative of how much the terrain represented by the land cell 61-69 is estimated to be saturated with water. In this regard, as will be described in more detail hereafter, for each cell 61-69, the land flow estimator 22 calculates how much water has been virtually absorbed into and remains in the ground of the land cell 61-69. The subterranean water indicator is indicative of this value. Generally, the more water that remains underground in the land cell 61-69 (i.e., the greater the cell's subterranean water indicator), the greater is the cell's saturation indicator. Note that the saturation indicator is based on the type of real world terrain of the geographic region represented by the cell. In this regard, some types of terrain can hold more water in a given area than other types of terrain. For example, rocky terrain typically holds less water than terrain composed of loose soil. Thus, for the same subterranean water indicator, a cell representing a rocky area may be more saturated and, thus, have a greater saturation indicator than a cell representing a non-rocky area that can absorb more water into the ground.

The surface water indicator of each land cell 61-69 is indicative of the volume of water that is on the surface of the terrain represented by the land cell 61-69. In this regard, as will be described in more detail hereafter, for each cell 61-69, the land flow estimator 22 calculates how much water is virtually on the surface of the land cell 61-69. The surface water indicator is indicative of this value. Generally, the more water that is virtually on the surface of the land cell 61-69, the greater is the cell's surface water indicator.

The water surface height for a land cell is indicative of the height of the surface of water, if any, that is on such land cell 61-69. The water surface height is equal to the height of the land cell plus the depth of the surface water on the land cell 61-69. The depth may be calculated according to the following formula: $d=V/lw$, where V is the volume of the surface water, l is the length of the land cell, and w is the width of the land cell.

The absorption indicator of each land cell 61-69 is indicative of the rate at which water absorbs into the terrain represented by the land cell 61-69. As an example, if the terrain represented by a particular land cell 61-69 is rocky or covered by concrete (e.g., a parking lot) such that water does not absorb into the ground at a high rate, then the absorption indicator indicates a lower rate of absorption relative to a land cell 61-69 representing terrain that absorbs water much faster, such as terrain composed of loose soil.

In one exemplary embodiment, a cell's current absorption indicator is a function of the cell's current saturation indicator. In general, the greater the cell's saturation indicator, the less is the cell's absorption indicator. Such behavior mimics the real world behavior where terrain that is more saturated tends to absorb water at a slower rate such that more of the water generally remains on the surface during a given time interval.

There are various techniques that can be used to make one indicator a function of another indicator. For example, a cell's absorption indicator can be made a function of the cell's saturation indicator by defining an equation that uses the saturation indicator as a variable within the equation. In another embodiment, a table of constant values for the absorption indicator may be defined. Each of the constant values may be correlated with a value for the saturation indicator. At run time for a given time step, a cell's saturation indicator value may be used to lookup in the table the constant value that is correlated with the same saturation indicator value. Such constant value may then be used as the cell's absorption indicator for the given time step. If there is not a match during the lookup, the appropriate constant value to be used for the absorption indicator may be interpolated. Various other techniques for defining and determining the absorption indicator are possible in yet other embodiments.

The surface flow resistance indicator of each land cell 61-69 is indicative of the flow resistance that water encounters when flowing over the surface of the terrain represented by the land cell 61-69. In this regard, the speed at which water travels over terrain that has many obstacles, such as buildings, trees, bushes, and rocks, is typically slower than the speed at which water travels over terrain having fewer obstacles. For example, a given amount of flood water may travel faster over a pasture devoid of trees, building, and other objects, relative to the same amount of flood water that travels through a dense forest. In one exemplary embodiment, the surface flow resistance indicator is greater for land cells 61-69 representing terrain that resists water flow more (e.g., has more obstacles).

The subterranean flow resistance indicator of each land cell 61-69 is indicative of the flow resistance that water encounters when flowing underground through the terrain represented by the land cell 61-69. In this regard, the speed at which water travels underground through terrain may be dependent on various factors, such as the composition of the terrain. In one exemplary embodiment, the surface flow resistance indicator is greater for land cells 61-69 representing terrain that resists underground water flow more, and the surface flow resistance indicator is a function of the saturation indicator. In general, the greater the cell's saturation indicator, the less is the cell's subterranean flow resistance indicator. Such behavior mimics the real world behavior where water tends to travel faster through terrain that is more saturated.

There are various techniques that can be used to make a cell's subterranean flow resistance indicator a function of the cell's saturation indicator. For example, the subterranean flow resistance indicator can be made of function of the saturation indicator by defining an equation that uses the saturation indicator as a variable within the equation. In another embodiment, a table of constant values for the subterranean flow resistance indicator may be defined. Each of the constant values may be correlated with a value for the saturation indicator. At run time for a given time step, a cell's saturation indicator value may be used to lookup in the table the constant value that is correlated with the same saturation indicator value. Such constant value may then be used as the cell's subterranean flow resistance indicator for the given time step. If there is not a match during the lookup, the appropriate constant value to be used for the subterranean flow resistance indicator may be interpolated. Various other techniques for defining and determining the subterranean flow resistance indicator are possible in yet other embodiments.

In one exemplary embodiment, each channel cell 81-84 corresponds to a respective area within a channel of the geographic region through which water flows. In one exemplary embodiment, each channel cell 81-84 is represented as a volumetric box with a trapezoidal shape, although other representations and shapes are possible in other embodiments. The terrain data 52 defines dimensions for each channel cell 81-84. In one exemplary embodiment, each channel cell 81-84 has a depth (d), a length (l), a surface width (w), and a floor width (fw), as shown by FIG. 2.

In one exemplary embodiment, the length and surface width (w) of each channel cell 81-84 is the same and matches the length and width, respectively, of the land cells 61-69. Further, each channel cell 81-84 is aligned with its two contiguous land cells 61-69 such that each corner of the channel cell is co-located, in the y-direction, with a respective corner of a contiguous land cell. For example, in FIG. 2, the channel cell 81 is aligned with the land cells 62 and 65.

The top of the channel cell 81-84 is assumed to be at the same height as the lowest contiguous land cell 61-69 (i.e., the contiguous land cell 61-69 having the lowest height). For example, in FIG. 2, the land cells 62 and 65 are the only ones contiguous with the channel cell 81. The height of the land cell 62 is less than the height of the land cell 65. Therefore, the top of the channel cell 81 is equal to the height of the land cell 62.

For each channel cell 81-84, the height of its bottom corresponds to the real world average height of the channel floor for the area represented by the channel cell. Further, the cell's depth is the difference between the height of the cell's top and the height of the cell's bottom. In addition, for each channel cell 81-84, the floor width is established such that the volume of the channel cell 81-84 is approximately equal to the volume of the real world channel area represented by the channel cell 81-84. Note that the slope between two channel cells refers to the difference between the height of the bottom, referred to hereafter as "floor," of one channel cell and the height of the floor of the other channel cell.

In the exemplary terrain model 58 of FIG. 2, the floor of the channel cell 81 has a height greater than the height of the floor of the channel cell 82. Further, the height of the floor of the channel cell 82 is greater than the height of the floor of the channel cell 83, and the height of the floor of the channel cell 83 is greater than the height of the floor of the channel cell 84. When water virtually flows through the channel comprising cells 81-84, the water flows from the cell 81 to the cell 82, from the cell 82 to the cell 83, and from the cell 83 to the cell 84.

For simplicity, the terrain model 58 shows a virtual channel that is one cell wide. In other embodiments, the width of the channel may include more than one cell, such as when a river being modeled is wider than the one modeled by FIG. 2.

As shown by FIG. 1, weather data 55 is stored in the memory 28 of the flood modeling system 20. The weather data 55 may comprise real-time data indicative of the current weather, such as current precipitation estimations, at the proximity of the geographic region being modeled. The weather data 55 may also comprise historical data indicative of a history of weather, such as past precipitation estimations, at the proximity of the geographic region being modeled, and the weather data 55 may comprise data indicative of predicted weather, such as future precipitation estimations, at the proximity of such geographic region. The weather data 55 may be downloaded via the network interface 39 from a weather source, such as the National Weather Service (NWS) or a radar system that is configured to track weather.

For each time step, a rainfall estimator 53 estimates an amount of rain that falls within the geographic region being modeled. In this regard, for each cell, the rainfall estimator 53 calculates, based on the weather data 55, an amount of rain that falls on the geographic region represented by the cell. For example, assume that a time step represents a time period from 11:00 a.m. to 11:15 a.m. of a particular day. For such time step, the rainfall estimator 53 estimates the cumulative amount of rain that falls from 11:00 a.m. to 11:15 a.m. on that day on the geographic region represented by the land cell 61. The rainfall estimator 53 similarly estimates the amount of rain that falls during the time period represented by the same time step for each of the other land cells. Thus, for each time step, the rainfall estimator 53 provides a value, referred to hereafter as the "rainfall estimation," for each cell representing the amount of rain estimated to fall on the real world geographic region represented by that cell. As will be described in more detail hereafter, the land flow estimator 22 and the channel flow estimator 25 use the rainfall estimations from the rainfall estimator 53 to estimate, cell-by-cell, the flood being modeled.

In this regard, the land flow estimator 22 models the flow of water over the geographic regions represented by the land cells 61-69, and the channel flow estimator 25 models the flow of water through the channel cells 81-84. Further, as will be described in more detail hereafter, water may virtually flow from the land model to the channel model and vice versa.

The land flow estimator 22 maintains data 56, referred to hereafter as "land flow data," indicative of the terrain parameters and the amount of water virtually above the surface and underground of each cell for each time step. In this regard, for each time step, the land flow estimator 22 calculates a new set of terrain parameters for each cell based on the set of terrain parameters for the previous time step.

In particular, for a new time step, the land flow estimator 22 calculates the amount of water that virtually enters and exits each respective land cell 61-69. Water virtually entering a land cell 61-69 over the surface from an adjacent cell or due to falling rain generally increases the amount of surface water in the land cell 61-69 and, therefore, increases the cell's surface water indicator. Note that the amount of water that virtually flows over the surface from one land cell 61-69, referred to as the "source land cell," to an adjacent land cell 61-69, referred to as the "receiving land cell," is based on several factors, such as the surface water indicator of the source land cell, the slope (i.e., difference in heights) between the two land cells, and the surface flow resistance of the source land cell. In this regard, the rate of water flow is generally less if there is less surface water in the source land cell (i.e., the surface water indicator is less), less of a slope, and/or less surface flow resistance (i.e., the surface flow resistance indicator is less). When it is determined that a given amount of water has virtually flowed over the surface from the source land cell to the receiving land cell, the land flow estimator 22 decreases the surface water indicator for the source land cell by such amount (indicating that there is less surface water in the source land cell) and increases the surface water indicator of the receiving land cell by such amount (indicating that there is more surface water in the receiving land cell). Note, however, that the land flow estimator 22 similarly adjusts the surface water indicator of each cell based on whether water flows into or out of the cell from or to other cells and other factors, such as whether there is any rainfall on the cell or water from one or more channel cells 81-84 for the given time step. Thus, for the given time step, the overall change to the surface water indicator for either the source land cell or the receiving land cell may be based on many factors.

In addition, the surface water indicator for a land cell 61-69 may be adjusted to account for absorption of water into the ground of the cell. In this regard, for each time step, the land flow estimator 22, based on a cell's absorption indicator (which is based on the cell's saturation indicator) estimates the amount of water that is virtually absorbed into the ground of the cell. The land cell estimator 22 decreases the surface water indicator by such amount and increases the subterranean water indicator by such amount.

Water virtually entering a land cell 61-69 underground from an adjacent cell generally increases the amount of subterranean water in the land cell 61-69 and, therefore, increases the cell's subterranean water indicator. Note that the amount of water that virtually flows underground from a source land cell to a receiving land cell is based on several factors, such as the subterranean water indicator of the source land cell, the slope (i.e., difference in heights) between the two land cells, and the subterranean flow resistance of the source land cell. In this regard, the rate of water flow is generally less if there is less underground water in the source land cell (i.e., the subterranean water indicator is less), less of a slope, and/or less subterranean flow resistance (i.e., the subterranean flow resistance indicator is less). When it is determined that a given amount of water has virtually flowed underground from the source land cell to the receiving land cell, the land flow estimator 22 decreases the subterranean water indicator for the source land cell by such amount (indicating that there is less underground water in the source land cell) and increases the subterranean water indicator of the receiving land cell by such amount (indicating that there is more underground water in the receiving land cell). Note, however, that the land flow estimator 22 similarly adjusts the subterranean water indicator of each cell based on whether water flows underground into or out of the cell from or to other cells and other factors, such as water that absorbs into the ground from the surface. Thus, for the given time step, the overall change to the subterranean water indicator for either the source land cell or the receiving land cell may be based on many factors.

Note that the land flow estimator 22 updates other terrain parameters, such as the saturation indicator and the absorption indicator, for each time step. For example, if the land flow estimator 22 determines that the net change to the subterranean water indicator is positive (i.e., increases such indicator), the land flow estimator 22 is configured to increase the saturation indicator and decrease the absorption indicator, as appropriate to account for the change of the subterranean water indicator. If the land flow estimator 22 determines that the net change to the subterranean water indicator is negative (i.e., decreases such indicator), the land flow estimator 22 is configured to decrease the saturation indicator and increase the absorption indicator, as appropriate to account for the change of the subterranean water indicator.

Moreover, for each time step, the land flow estimator 22 updates the terrain parameters for each land cell 61-69, as appropriate, thereby providing a new set of terrain parameters, to account for the overall changes in the cell's surface and subterranean water estimates. Note that water may virtually flow from a land cell 61-69 into an adjacent channel cell 81-84 just as water that flows from a land cell 61-69 into an adjacent land cell. For example, in FIG. 2, surface water in the land cell 61 may flow from the land cell 61 to the land cell 62. In addition, subterranean water may flow underground from the land cell 61 to the land cell 62. Similarly, surface water in the land cell 62 may flow from the land cell 62 to the channel cell 81. In addition, subterranean water may flow underground from the land cell 62 to the channel cell 81.

Similar to the land flow estimator 22 that, for each time step, calculates the amount of water that virtually enters and leaves a given land cell 61-69, the channel flow estimator 25 calculates the amount of water that virtually enters and leaves a given channel cell 81-84. The channel flow estimator 25 also maintains data 59, referred to hereafter as the "channel flow data," indicative of various parameters, referred to hereafter as "channel parameters," including the amount of water determined to be in each channel cell 81-84 for each time step. In this regard, the channel parameters include a value, referred to hereafter as "channel water indicator," for each channel cell 81-84 indicating the amount of water determined to be in the channel cell 81-84 for a given time step. Thus, the channel water indicator can be analyzed to determine how much water is estimated, by the channel flow estimator 25, to be in the corresponding real world channel area for the time step.

For a flowing body of water through the channel, the bed of each channel cell 81-84 is assumed to be saturated with water such that there is no water that absorbs from the channel cell 81-84 into the channel bed. Thus, it is assumed that any water that flows from a channel cell 81-84 either flows into an adjacent channel cell or overflows the channel cell 81-84 (e.g., floods an adjacent land cell 61-69). Such overflow will be described in more detail hereafter. The channel parameters include, for each channel cell, a value, referred to hereafter as the "channel flow resistance indicator," indicative of the flow resistance that water encounters when flowing through the real world channel area represented by the channel cell 81-84. In this regard, the speed at which water travels through a channel that has many obstacles, such as rocks, is typically slower than the speed at which water travels through a channel having fewer obstacles. In one exemplary embodiment, the channel flow resistance indicator is greater for channel cells 81-84 representing real world channels that resist water flow more (e.g., have more obstacles). Thus, the greater the channel flow resistance indicator for a given channel cell 81-84, the slower is the water that virtually flows through the channel cell 81-84.

For each time step, the channel flow estimator 25 estimates the amount of water that virtually flows from one channel cell 81-84, referred to as the "source channel cell," to an adjacent downstream channel cell 81-84 referred to as the "receiving channel cell." The rate that water virtually flows from the source channel cell to the receiving channel cell is based on several factors, including the channel flow resistance indicator of the source channel cell and the slope (i.e., difference in floor heights) between the source channel cell and the receiving channel cell. In this regard, the rate of flow is generally greater when the flow resistance indicator of the source channel cell is less and/or when the slope between the two cells is greater. Such behavior mimics the real world behavior of water flowing faster through a channel when there is less flow resistance (e.g., fewer rocks) and a greater slope. The flow rate may also be based on the channel water indicators of the source channel cell and/or the receiving channel cell. For example, the flow rate may be higher if the amount of water in the source channel cell is higher (i.e., the channel water indicator of the source channel cell is higher).

For each time step, the channel flow estimator 25 calculates a new channel water indicator for each channel cell 81-84. For example, after determining an amount of water that flows from a source channel cell to a receiving channel cell for a given time step, the channel flow estimator 25 decreases the channel water indicator of the source channel cell by such amount and increases the channel water indictor of the receiving channel cell by such amount. Note that, for any given time step, the source channel cell may receive water from another channel cell or from a land cell such that the overall change to the channel water indicator for the time step is based on many factors. Further, for any given time step, water may flow from a receiving channel cell to another channel cell or a land cell such that the overall change to the channel water indictor for the receiving channel cell is similarly based on many factors. Moreover, for each time step, the land flow estimator 22 updates the terrain parameters for each land cell 61-69, thereby providing a new set of terrain parameters, to account for the overall changes in the cell's surface water and subterranean water. In addition, for each time step, the channel flow estimator 25 updates the channel parameters for each channel cell 81-84, as appropriate, thereby providing a new set of channel parameters, to account for the overall changes in the cell's water estimate.

Figure 3:
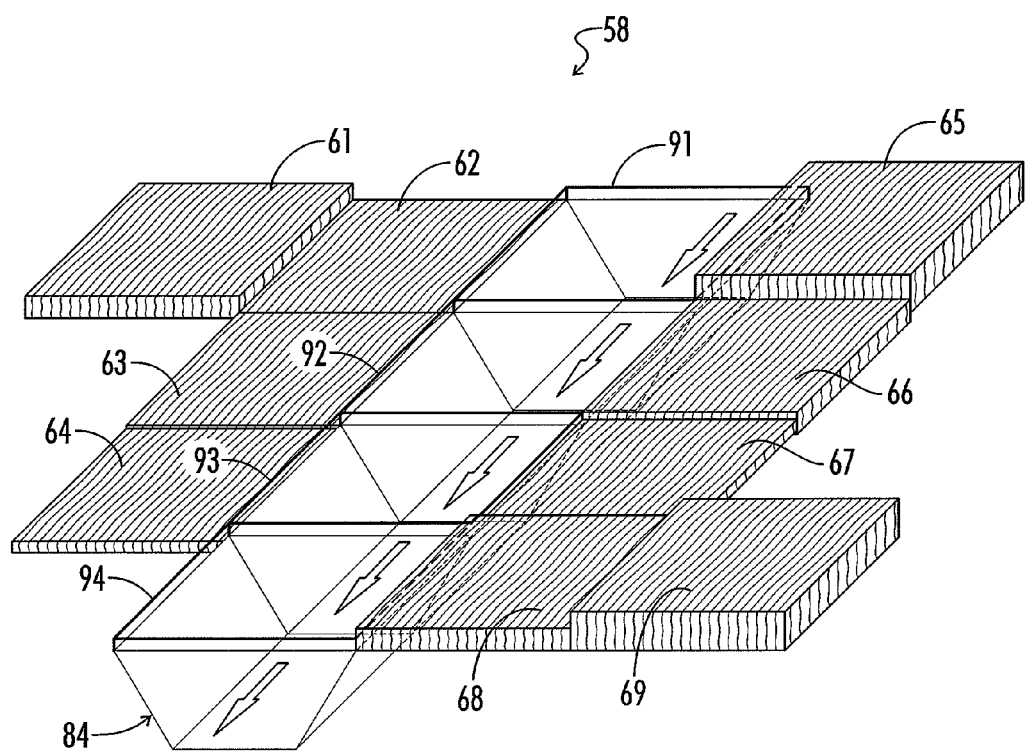
FIG. 3 is a diagram illustrating overwater (OW) land cells of the exemplary terrain model of FIG. 2.

In one exemplary embodiment, each channel cell 81-84 is covered by a respective land cell 91-94 that is aligned with the channel cell 81-84 and has the same length and width, as shown by FIG. 3. A land cell 91-94 covering a channel cell 81-84 shall be referred to hereafter as an "overwater (OW) land cell." Each OW land cell differs from other land cells 61-69 in that its absorption indicator is established to indicate that no water absorbs below the surface of the OW land cell as long as the channel cell covered by the OW land cell remains full of water. That is, the surface of an OW land cell is assumed to be impermeable if the channel cell covered by the OW land cell is full of water. Further, the subterranean water indicator of an OW land cell 91-94 is set to indicate that there is no subterranean water in the OW land cell. In addition, the surface flow resistance indicator of an OW land cell 91-94 is set to indicate that there is no surface resistance to water flow. For each time step, water on the surface of an OW land cell 91-94 may flow to one or more adjacent cells, which could be either land cells 61-69, channel cells 81-84, or other OW land cells 91-94.

Note that if the water surface height of the channel cell covered by an OW land cell decreases such that the channel cell is no longer full of water, then it is assumed that any water in the OW land cell flows to the underlying channel cell to an extent until the underlying channel cell is full of water (at which point the OW land cell is considered impermeable) or the water in the OW land cell is exhausted.

In one exemplary embodiment, the maximum value of the channel water indicator for a given channel cell 81-84 is the value that is calculated when the channel cell is full of water. That is, when the volume of water indicated by the channel water indicator is equal to the volume of the channel cell, the channel water indicator is at its maximum. If the channel flow estimator 25 determines that water overflows a channel cell 81-84 for any given time step, then the amount of water that exceeds the volume of the channel cell 81-84 is assumed to flow above the surface of the OW land cell 91-94 that is above such channel cell.

Figure 4:
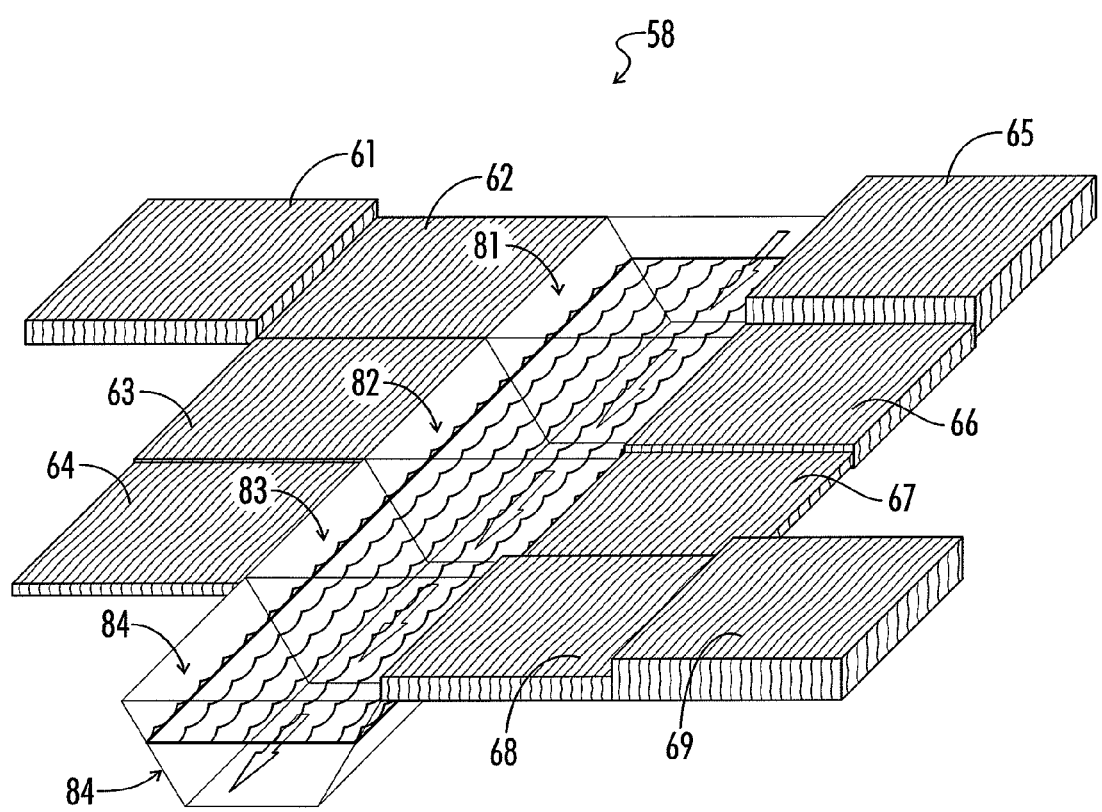
FIG. 4 is a diagram illustrating the exemplary terrain model of FIG. 2.

To better illustrate the foregoing, assume that the amount of water virtually in each channel cell 81-84 is at a maximum. That is, each channel cell 81-84 is completely full of water. Such a behavior mimics a real world scenario where the real world channel is completely full such that if additional water is added to the channel, the channel will overflow causing a flood. The terrain model 58 for the initial time step is shown graphically by FIG. 4 in which the surface of water is shown, for each channel cell 81-84, to coincide with the top of the channel cell.

For each time step, the land flow estimator 22 calculates the terrain parameters for each land cell 61-69 and 91-94. That is, the land flow estimator 22, for each land cell 61-69 and 91-94 calculates the amount of water that virtually flows into the land cell from adjacent cells and/or from rain (as indicated by the rainfall estimator 53) and the amount of water that flows from the land cell. The land flow estimator 22 also calculates the amount of water that is virtually absorbed into the ground of each land cell 61-69, noting that there is no absorption for the OW land cells 91-94 if their underlying channel cells 81-84 are full of water.

In this regard, water virtually flows from a land cell 61-69 or an OW land cell 91-94 when the water surface height of the water on such cell is determined to be greater than the water surface height of an adjacent cell (or the surface height of the adjacent cell if there is no water on the surface of the adjacent cell). The flow of water from a cell 61-69, 91-94 generally reduces the surface water indicator and, hence, the water surface height for such cell (assuming that the water leaving the cell is not replaced by incoming water to the cell). Flow continues from one cell to an adjacent cell, thereby reducing the cell's water surface height, until the cell's water surface height equals the water surface height of the adjacent cell (or the height of the adjacent cell if there is no surface water on the adjacent cell).

For illustrative purposes, assume that the land flow estimator 22 determines that, for a given time step, the terrain parameters of all of the land cells 61-69 and 92-94, except the OW land cell 91 as will be described in more detail below, do not initially change. Further assume that, for the same time step, the amount of water flowing into the channel cell 91 exceeds the amount to water flowing from the channel cell 91 by an amount, x. As an example, the rainfall estimator 53 may estimate that a significant amount of rain falls on the channel cell 81 and provide a rainfall estimation indicative of such amount to the channel flow estimator 25. In other examples, the source of the water virtually flowing into the channel cell 81 may also be from other sources in other examples, such as an upstream channel cell (not shown) or an adjacent land cell 61 or 65.

If the channel water indicator for the channel cell 81 was not at a maximum, the channel flow estimator 25 would increase the channel water indicator. In this regard, assume that y=max−CWI, where "max" is the maximum value of the channel water indictor (i.e., the value of the channel water indicator when the cell 81 is full of water) and CWI is the present channel water indicator for the channel cell 81. That is y represents the present capacity of the channel cell 81. If y is greater than or equal to x, then the new channel water indicator calculated for the next time step is set according to the following equation: CWI=CWI+x. However, if y is less than x, then the channel water indicator is assigned the maximum value, max, and the surface water indicator (SWI) for the OW land cell 91 is set according to the following equation: SWI=x−y. Thus, in such an example, the influx of water x virtually fills the channel cell 81 with water (assuming that the channel cell 81 is not full prior to the influx x), and the remaining water flows onto the surface of the OW land cell 91.

Figure 5:
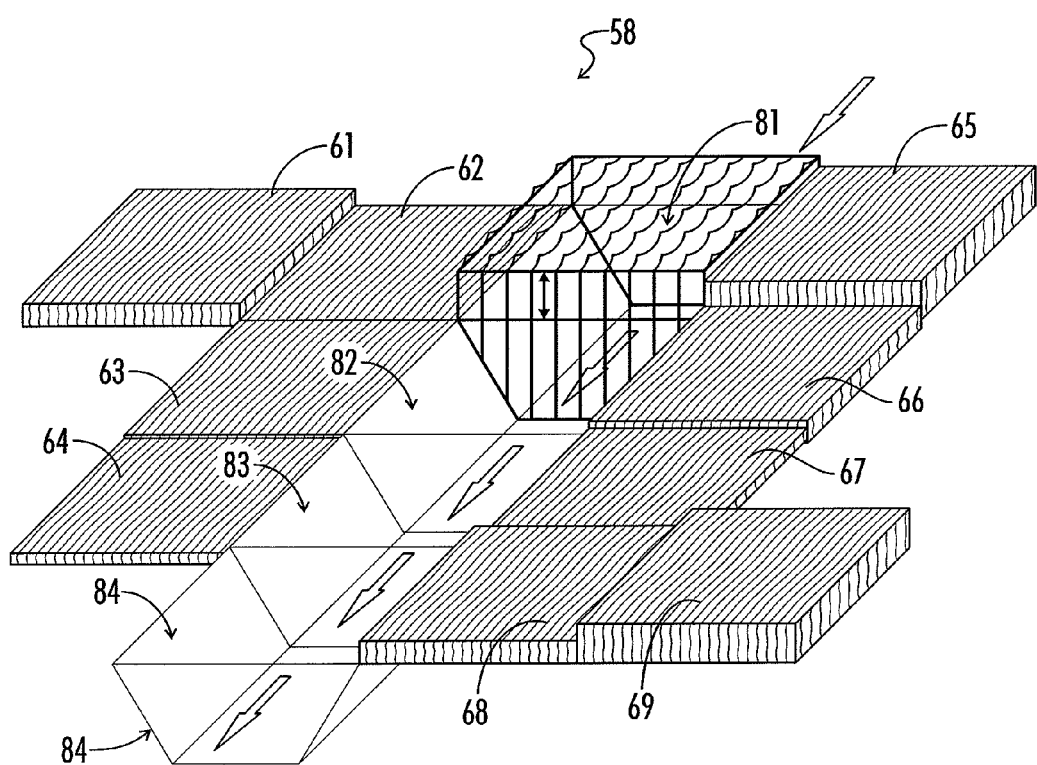
FIG. 5 is a diagram illustrating the exemplary terrain model of FIG. 3 after a water inundation event has caused an influx of water to an OW land cell.

However, in the instant example, it is assumed that the channel water indicator for the channel cell 81 is initially at a maximum. Thus, the surface water indicator of the OW land cell 91 is set to equal x indicating that all of the water from the influx flows onto the surface of the OW land cell 91 since the underlying channel cell 81 is already full of water. Such a scenario is shown graphically by FIG. 5 where the volume of water over the surface of the OW land cell 91 is equal to x. Further, the dimensions of the volume of water over the OW land cell 91 are represented by the following formula: $x=lwd_{91}$, where l is the length of the cell 91, w is the width of the cell 91, and $d_{91}$ is the depth of the water volume above the cell 91.

When water is on the surface of a land cell, the water flows from the land cell to at least one adjacent cell if the water surface height of the land cell is greater than the water surface height of the adjacent cell (or the surface height of the adjacent cell if there is no water on the surface of the adjacent cell). If there are more than one adjacent cells for which the flow of water from a land cell is possible, then it is assumed that water flows first to the cell having the lowest water surface height thereby flooding such adjacent cell. Once the water surface height of the receiving cell reaches the water surface height of another adjacent cell (or the surface height of the other adjacent cell if there is not water on the surface of the other adjacent cell), then water begins flowing into both adjacent cells.

Figure 6:
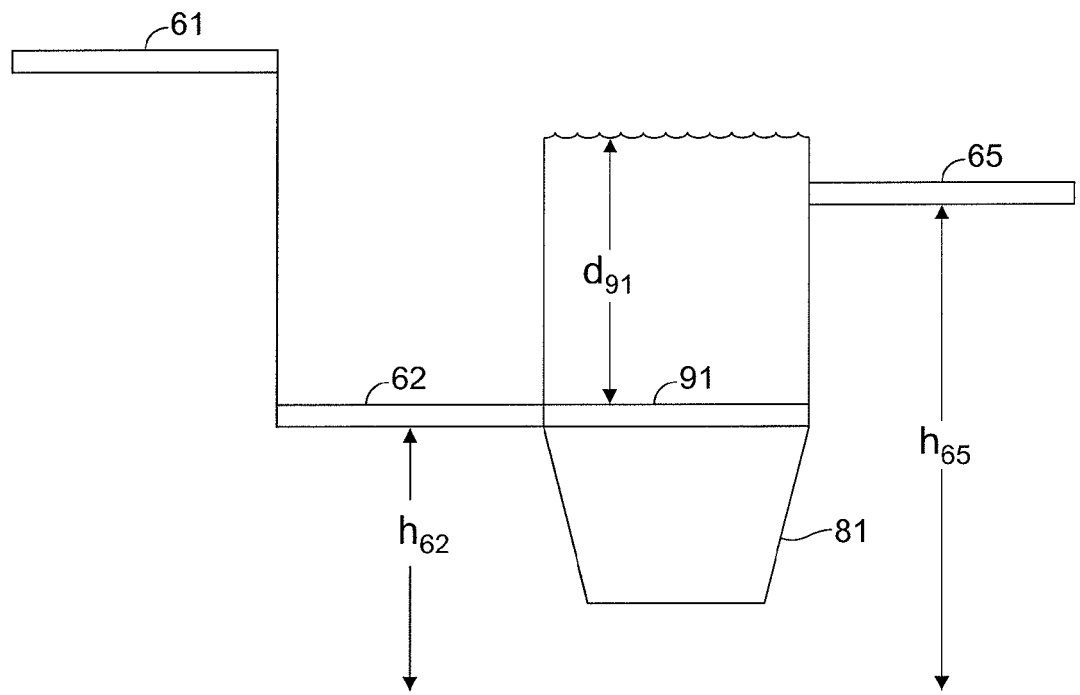
FIG. 6 is a diagram illustrating a side view of an OW land cell along with two adjacent land cells depicted in FIG. 5.

As an example, assume that the height of the surface of the volume of water above the OW land cell 91 (FIG. 3) exceeds the height of the land cell 65, as shown by FIG. 6. In FIG. 6, $h_{62}$ represents the height of the land cell 62, and $h_{65}$ represents the height of the land cell 65. Further, $d_{91}$ represents the depth of the volume of water above the OW land cell 91. For the purpose of this example, assume that the height of land cell 61 is greater than the height of land cell 65. Since the surface height of the water on the OW land cell 91 exceeds both the heights of the land cells 62 and 65, there is a possibility of water flowing from the land cell 91 to both land cells 62 and 65.

Figure 7:
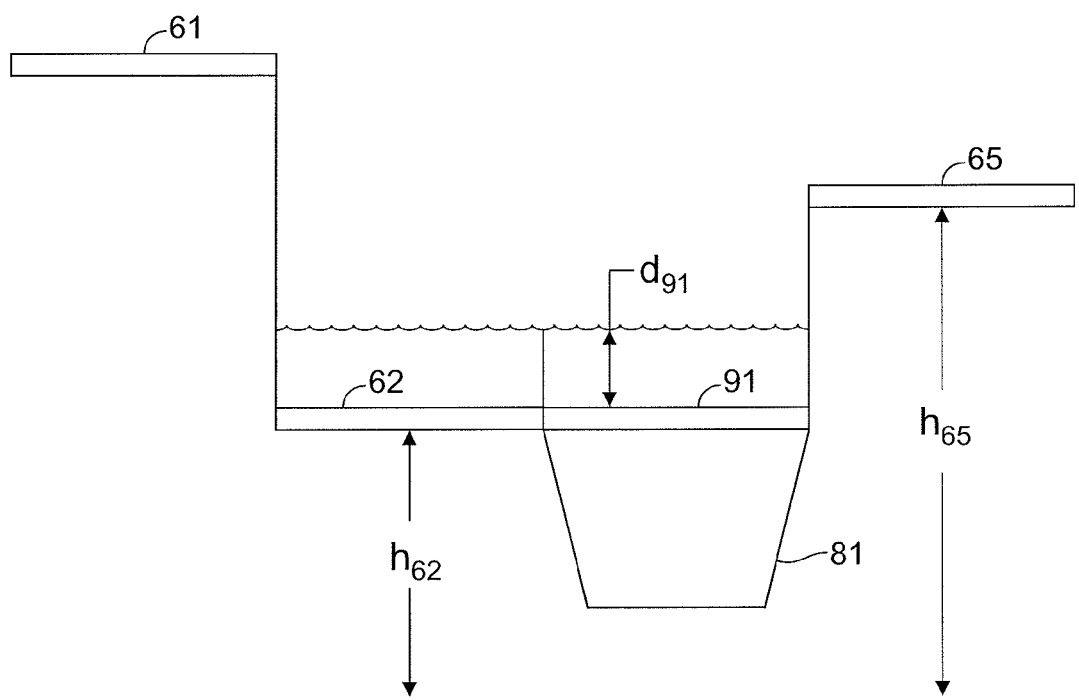
FIG. 7 is a diagram illustrating the OW land cell and adjacent land cells of FIG. 6 after water has virtually flowed from the OW land cell to an adjacent cell.

For such example, since the height of the land cell 62 is less than that of the land cell 65, it is assumed that water initially flows from the cell 91 to the cell 62 (thereby decreasing the height, $d_{91}$, of the water on the cell 91) without water flowing to the cell 65 until the surface height of the water on the cell 91 reaches the surface height of the water on the cell 62 or until the surface height of the water on the cell 62 reaches the height of the cell 65. For illustrative purposes, assume that the surface height of the water on the cell 91 reaches the surface height of the water on the cell 62 as water is flowing from the cell 91 to the cell 62, as shown by FIG. 7. At this point, since the water surface height of the cell 62 is equal to the water surface height of the cell 91, it is assumed that no more water flows from the cell 91 to the cell 62. Further, since the water surface height of the cells 91 and 62 is below the height of the cell 65, it is assumed that no water flows from the cell 91 to the cell 65.

Thus, at the conclusion of the time step in which water flows from the cell 91 to the cell 62, the volumes of water over cells 62 and 91 are equal (assuming that the cells 62 and 91 have equal lengths and widths). The volume, $V_{91}$, of water over the cell 91 (and, hence, the volume of water over the cell 62) can be calculated according to the formula $V_{91}=d_{91}lw$, where $d_{91}$ is the depth of the water over the cell 91, l is the length of the cell 91, and w is the width of cell 91. Further, the total volume, $V_T$, of water flowing from the surface of the OW land cell 91 is equal to the volume of water over the cell 62 (excluding other factors such as absorption of water into the ground or the flow of water into other cells).

Figure 8:
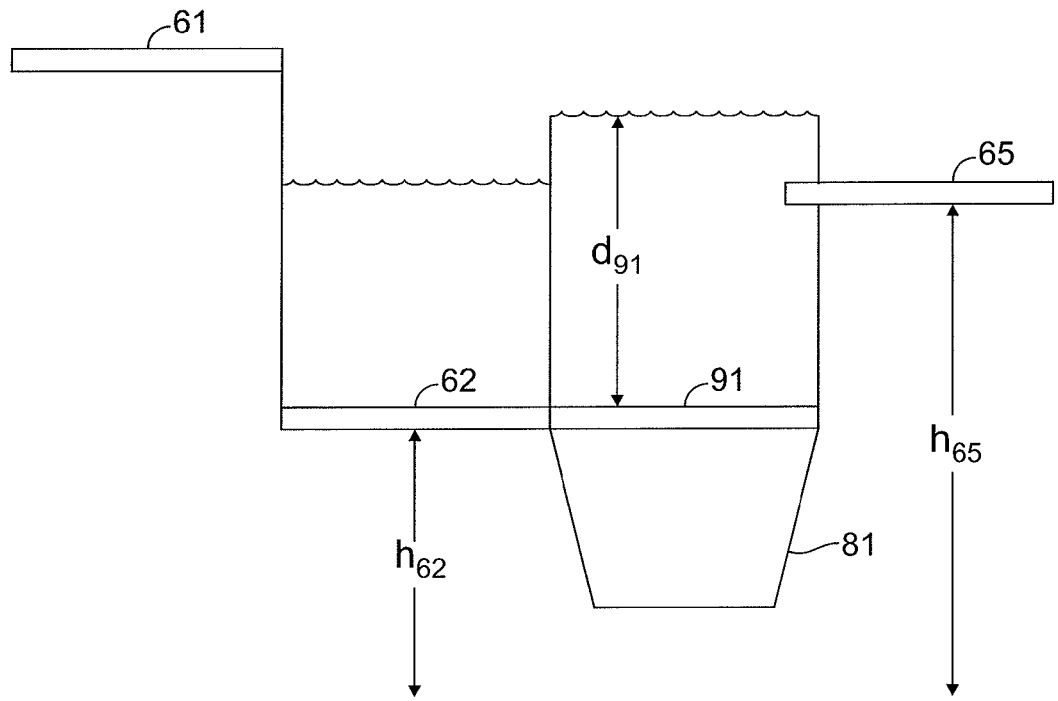
FIG. 8 is a diagram illustrating the OW land cell and adjacent land cells of FIG. 6 after water has virtually flowed from the OW land cell to an adjacent land cell.
Figure 9:
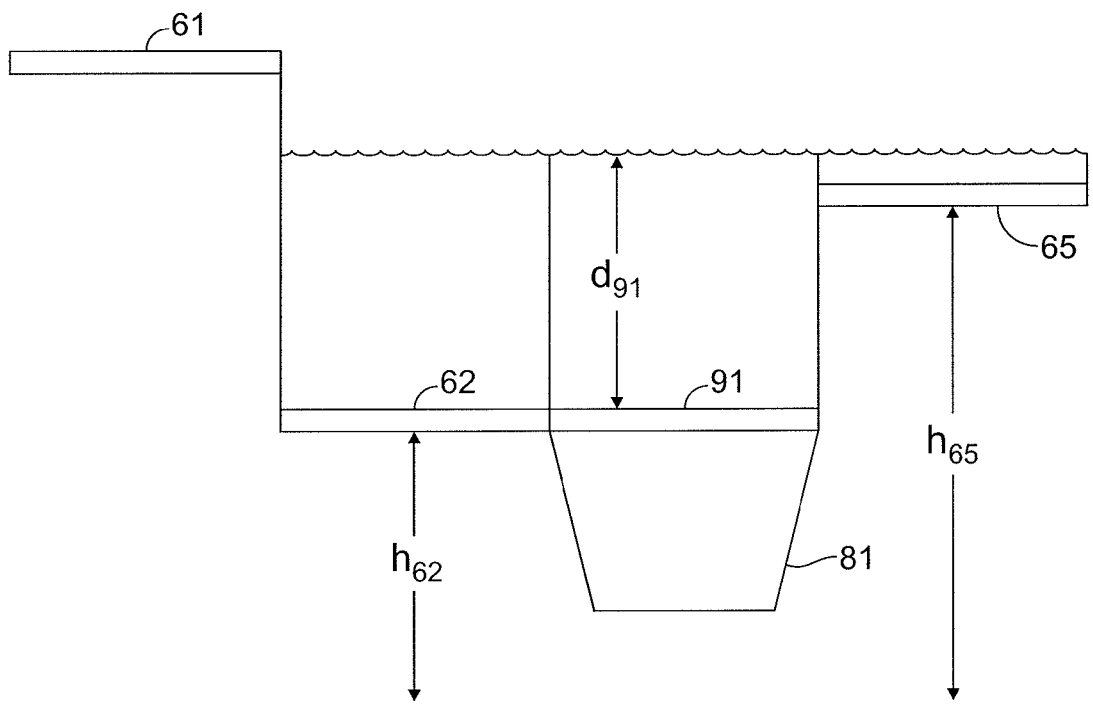
FIG. 9 is a diagram illustrating the OW land cell and adjacent land cells of FIG. 6 after water has virtually flowed from the OW land cell to both adjacent land cells.

Now assume that the water surface height of the cell 62 reaches the height of the cell 65 before the water surface height of the cell 91 reaches the water surface height of the cell 62, as shown by FIG. 8. In such an example, both cells 62 and 65 are adjacent to a cell 91 having a greater water surface height, and the water surface height of the cell 62 is equal to the height of the cell 65, which has no water on its surface. Thus, water flows from the cell 91 to both of the cells 62 and 65 increasing the water surface height of both cells 62 and 65 until the water surface heights of all of the cells 62, 65, and 91 are the same, as shown by FIG. 9.

Thus, at the conclusion of the time step in which water flows from the cell 91 to the cells 62 and 65, the volumes of water over cells 62 and 91 are equal (assuming that the cells 62, 65, and 91 have equal lengths and widths). Such volumes can be calculated according to the equations described above in the foregoing paragraph. Further, the volume, $V_{65}$, of the water over the cell 65 can be calculated according to the formula $V_{65}=(d_{91}-h_{65})wl$, where $h_{65}$ is the height of the cell 65, l is the length of cell 65, and w is the width of cell 65, and $d_{91}$ is the depth of the water over the OW land cell 91. Further, the total volume of water flowing from the surface of the OW land cell 91 is equal to the volume of water over the cell 62 plus the volume of water over the cell 65 (excluding other factors such as absorption of water into the ground or the flow of water into other cells).

Figure 10:
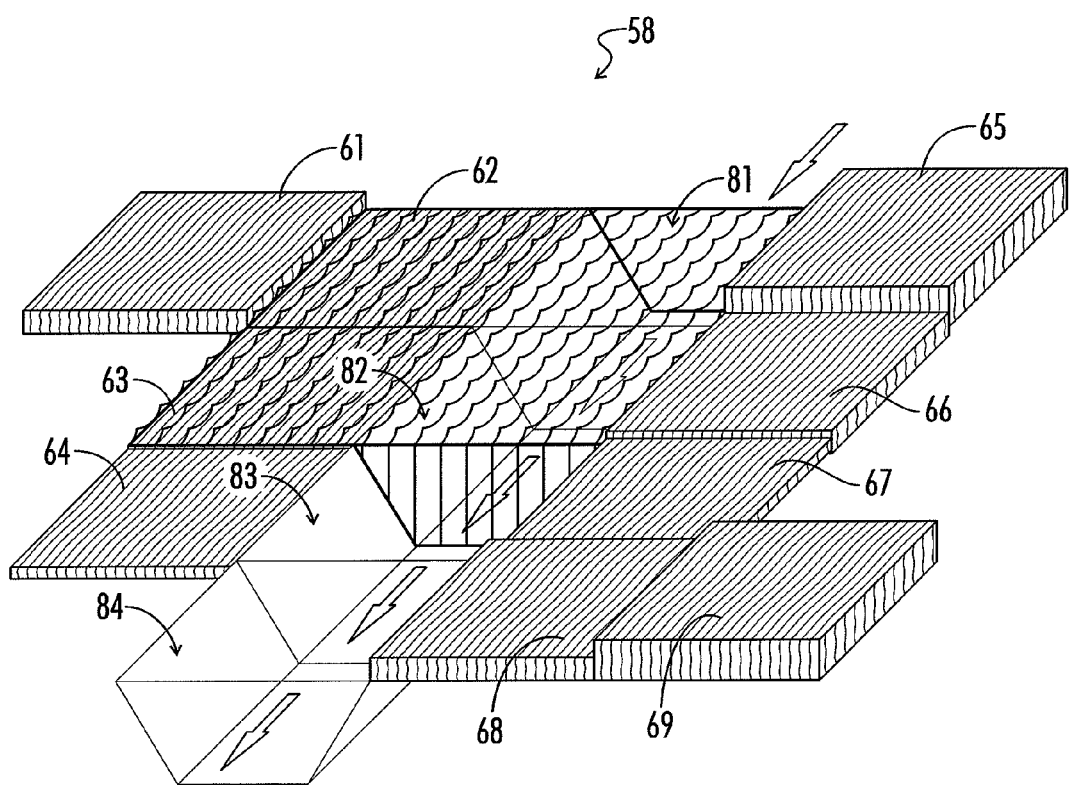
FIG. 10 is a diagram illustrating the exemplary terrain model of FIG. 5 after water has virtually flowed from the OW land cell.

Now assume that height of the surface of the volume of water on the OW land cell 91 is greater than the height of the land cell 62 (by an amount equal or less than the height of the land cell 65). In such a scenario, no water flows from the OW land cell 91 to the land cell 65 since the water surface height of the OW land cell 91 is less than the height of the land cell 65. In such an example, the water virtually flowing from the OW land cell 91 reduces the depth of the water over the OW land cell 91 until such the height of the water surface over the OW land cell 91 matches the height of the surface of water on the land cell 62 (or the height of the land cell 62 itself if there is no water on the surface of the land cell 62). Some of the surface water on the land cell 62 that originally flowed from the OW land cell 91 virtually flows to the land cell 63 and then to the channel cell 82, as shown by FIG. 10. In addition, some of the surface water on the land cell 62 is absorbed into the ground based on the absorption indicator for the land cell 62.

Water flowing from the OW land cell 91 to the land cell 62 increases the surface water indicator of the land cell 62. Surface water flowing from the land cell 62 to the land cell 63 increases the surface water indictor of the land cell 63 (unless all such water is absorbed into the ground) and decreases the surface water indicator of the land cell 62. In addition, water that absorbs into the ground of the land cell 62 decreases the surface water indicator of the land cell 62 and increases the subterranean water indicator and the saturation indicator (potentially decreasing the absorption indicator) for the land cell 62.

Note that absorption of water into the ground and surface water flowing from the land cell 62 reduce the depth of the surface water on the land cell 62 creating a difference between the height of such surface water and the height of the water on the OW land cell 91. If there is a difference in surface height between the water on the two cells 62, 91, then water flows from the cell having a smaller water surface height to the cell having the greater water surface height until the water surface heights are equal. Thus, the absorption of the surface water that is on the land cell 62 and the flow of surface water from the land cell 62 to the adjacent land cell 63 cause more water to virtually flow from the OW land cell 91 to the land cell 81 until all of the water on the OW land cell 91 is eventually exhausted. Note that water may also flow from the OW land cell 91 to the channel cell 82 or OW land cell 92 downstream of the OW cell 91 thereby decreasing the time from the influx of water to the cell 91 until the exhaustion of water on the cell 91.

The flows of water from the land cell 63 to the channel cell 82 and from the channel cell 81 and/or the OW land cell 91 to the channel cell 82 increase the volume of water in the channel cell 82 until it is full. At such point, any water that otherwise would flow into the channel cell 82 instead flows to the OW land cell 92 increasing the volume of water and, hence, the water surface height for this cell 92 until the water surface height matches the water surface height of the adjacent land cell 63. In the example depicted by FIG. 10, the water surface height for the OW land cell 92 does not exceed the height of the adjacent land cell 66. Thus, water does not virtually flow from the OW land cell 92 to the land cell 66.

Figure 11:
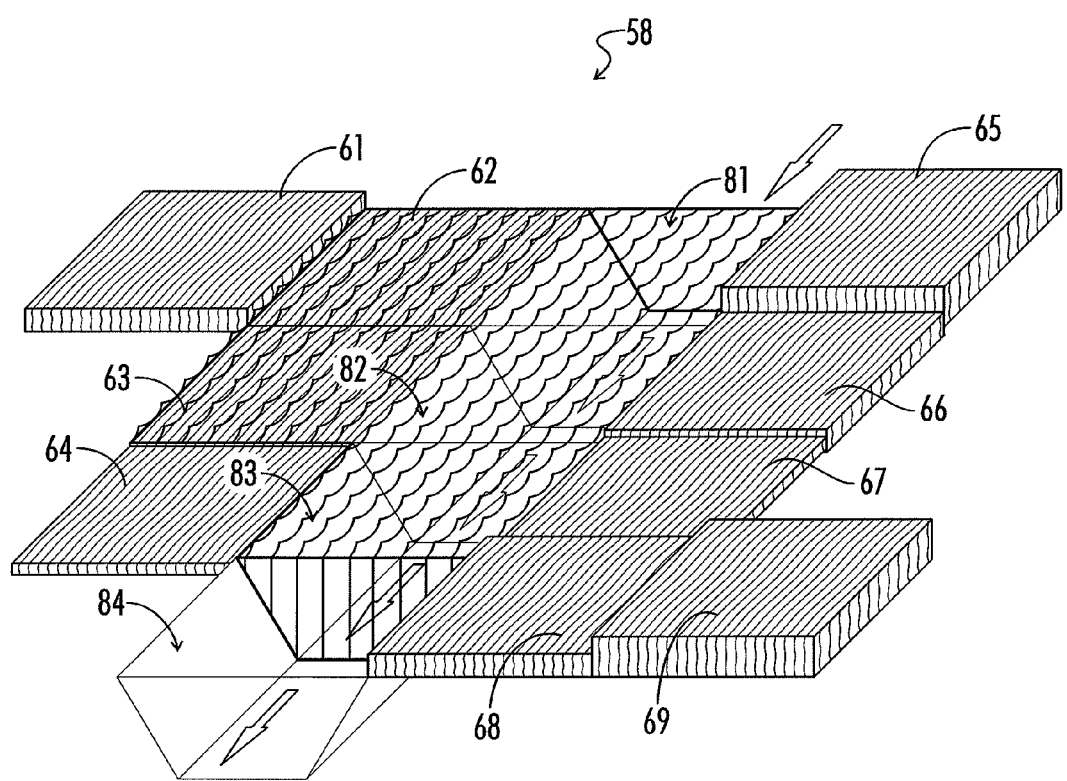
FIG. 11 is a diagram illustrating the exemplary terrain model of FIG. 10 after water has virtually flowed further from the OW land cell.
Figure 12:
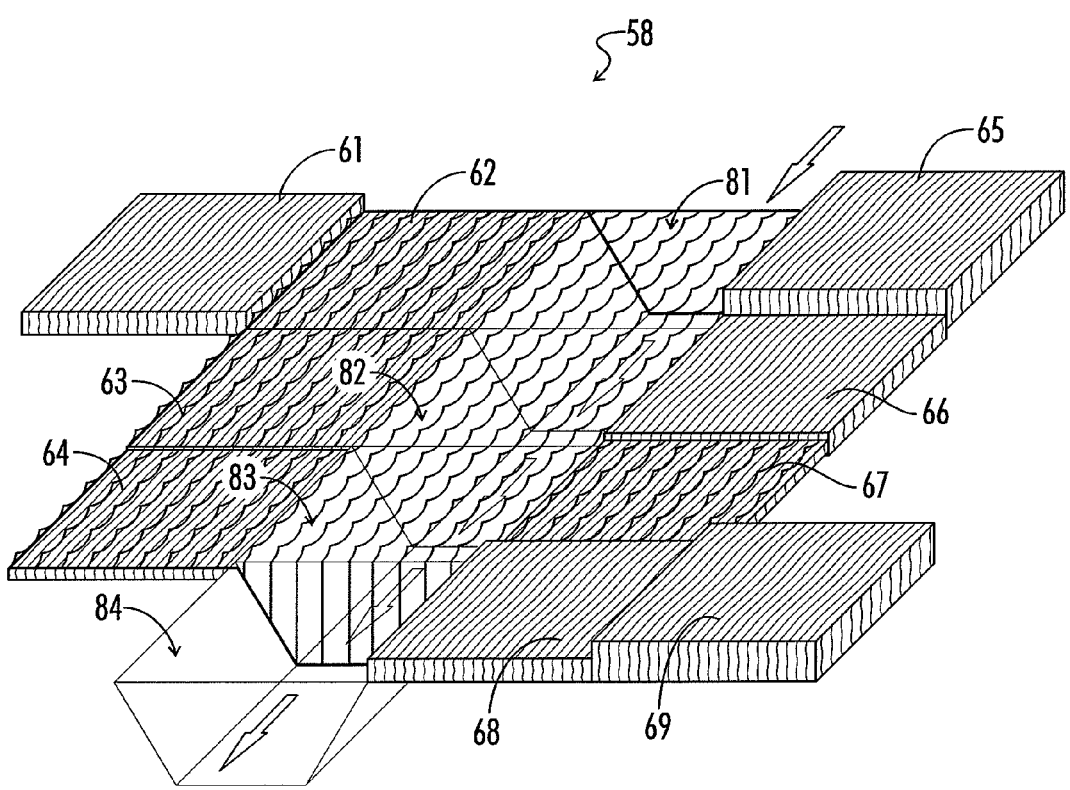
FIG. 12 is a diagram illustrating the exemplary terrain model of FIG. 11 after water has virtually flowed yet further from the OW land cell.

As shown by FIG. 11, excess water originating from the OW land cell 91 eventually reaches the channel cell 83. If the channel cell 83 is not full, the water flows into the channel cell 83. However, once the channel cell 83 is full of water, water that otherwise would have flowed into the channel cell 83 instead flows into the OW land cell 93 that is above the channel cell 83. Accordingly, the OW land cell 93 has a surface water height that is greater than the heights of the adjacent land cells 64 and 68. This height discrepancy results in water flowing from the OW land cell 93 to both adjacent land cells 64 and 68, as shown by FIG. 12.

Figure 13:
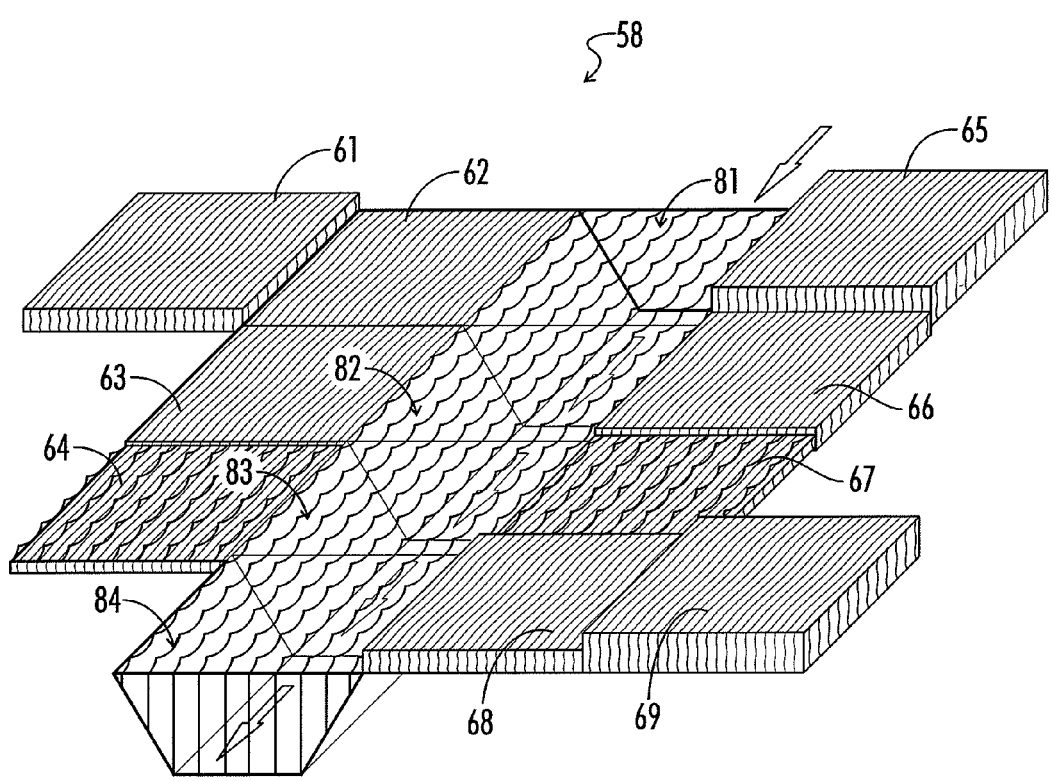
FIG. 13. is a diagram illustrating the exemplary terrain model of FIG. 12 after water has virtually flowed yet further from the OW land cell.

Eventually, the water that originally flooded the land cells 62 and 63 flows entirely out of the cells 62 and 63 and/or is absorbed into the ground such that no surface water exists on the cells 62 and 63, as shown by FIG. 13. Note that as time steps progress, the flood water originally from the OW land cell 91 also causes water to overflow from the channel cell 84 to the OW land cell 94 that is above the channel cell 84. Indeed, the water influx originally received by the OW land cell 91 may cause cells downstream from the vicinity of the cell 91 to flood even after the effects of such water influx have abated within the immediate vicinity of the cell 91.

Figure 14:
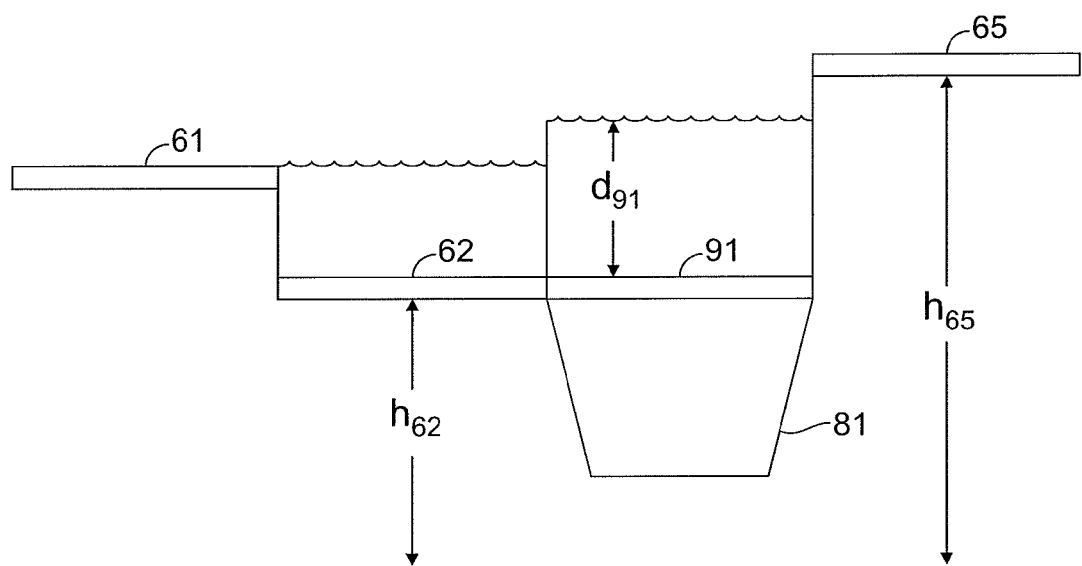
FIG. 14 is a diagram illustrating a side view of OW land cell along with adjacent land cells depicted in FIG. 5.
Figure 15:
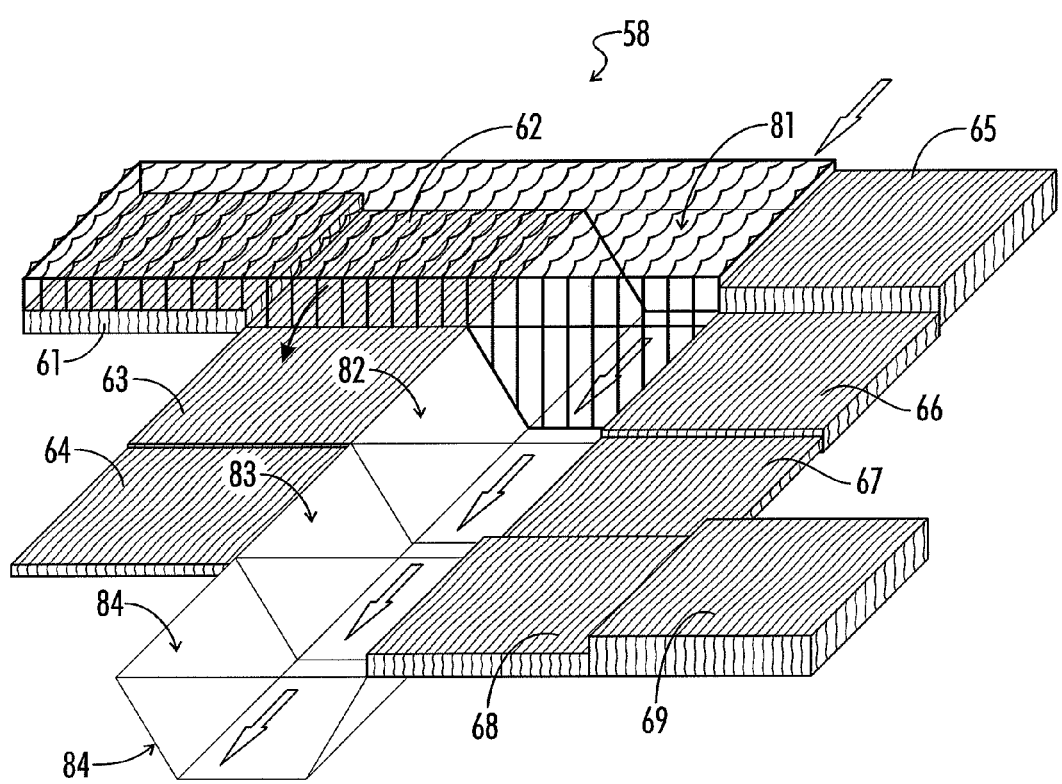
FIG. 15 is a diagram illustrating the exemplary terrain model of FIG. 5 after water has virtually flowed from the OW land cell.

In the above examples, it is assumed that the water surface height of the land cell 62 does not reach the height of the land cell 61. However, assume that the height of the land cell 61 is less than the height of the land cell 65 and that the water surface height of the cell 62 reaches the height of the land cell 61 as water is flowing from the OW land cell 91 before the water surface height of the OW land cell 91 reaches the water surface height of the land cell 62, as shown by FIG. 14. Thus, as water is flowing from the OW land cell 91 to the land cell 62, a point is eventually reached where the water in the land cell 62 begins flowing into the land cell 61 such that both land cells 61 and 62 are flooded by the water from the OW land cell 91, as shown by FIG. 15. Eventually, a point is reached where the water flowing from the land cell 62 to the land cell 63 or otherwise exiting from the surface of the land cell 62 (for example being absorbed into the ground) causes the water surface height of the land cell 62 to fall below the water surface height of the land cell 61 such that water begins to flow from the land cell 61 back to the land cell 62. However, as the above example illustrates, it is possible for water to flow from a land cell 62 of a lesser height to a land cell 61 of a greater height depending on the amount of surface water on each respective cell.

An exemplary operation and use of the land flow estimator 22 will now be described with particular reference to FIG. 16.

Figure 16:
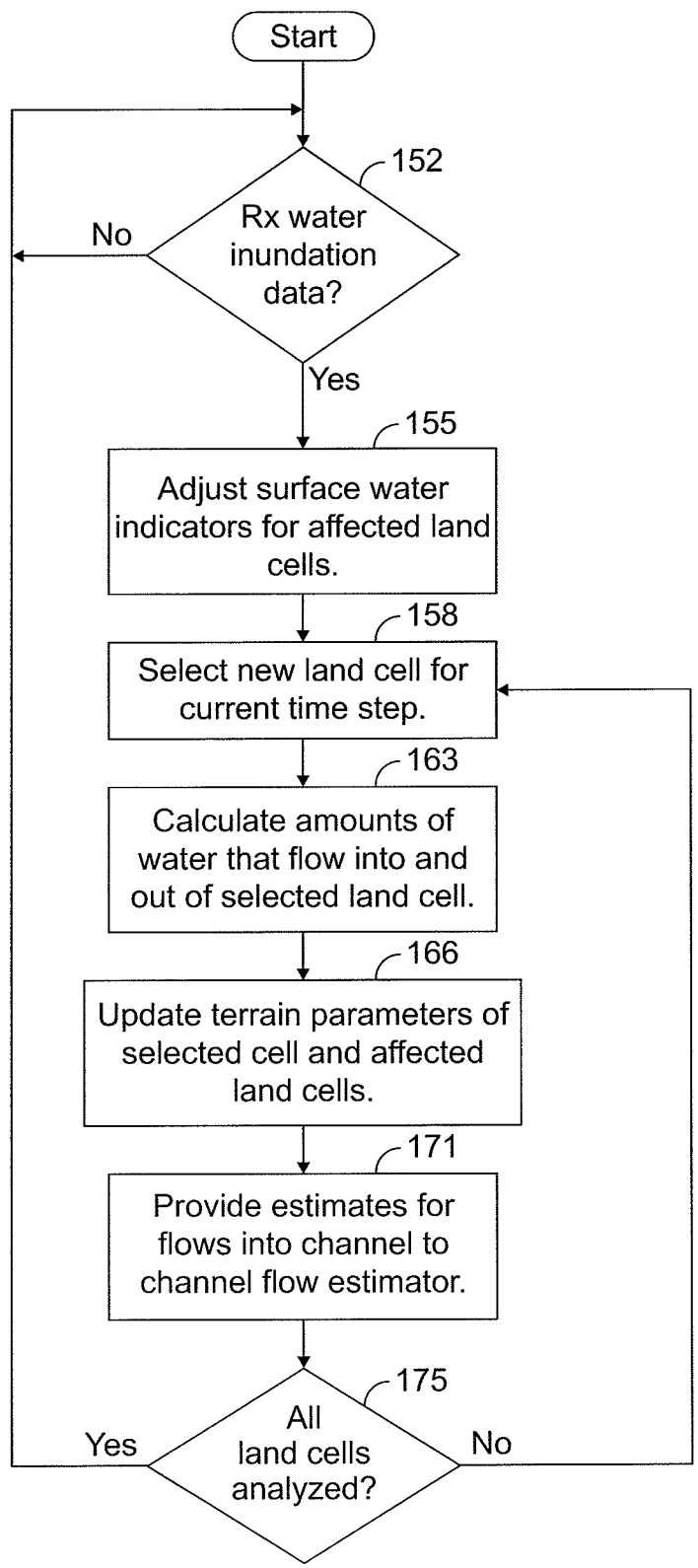
FIG. 16 is a flow chart illustrating an exemplary operation of a land flow estimator, such as is depicted in FIG. 1.

As shown by block 152 of FIG. 16, the land flow estimator 22 determines when it has received water inundation data for the current time step. Such data may be derived from a variety of sources. For example, the rainfall estimator 53 may estimate the amount of rain that falls on each respective land cell 61-69 and 91-94 and provide data indicative of such estimates to the land flow estimator 22. Note that for some time steps, it is possible for the rainfall estimator 53 to determine that no rain falls on any of the land cells 61-69 and 91-94. In addition, the land flow estimator 22 may receive water inundation data from other sources for the current time step. As an example, the land flow estimator 22 may receive data indicating an amount of water received by one or more land cells due to a dam bursting or some other event that causes an influx of water.

Once the land flow estimator 22 has received the water inundation data, the land flow estimator 22 adjusts the surface water indicators of the land cells 61-69 and 91-94 affected by the water inundation indicated by the received data, as shown by block 155 of FIG. 16. In particular, the land flow estimator 22 increases by an appropriate amount the surface water indicator for each land cell 61-69 and 91-94 that is determined to receive water due to the water inundation events indicated by the received data. Note that such adjustments likely cause discrepancies in water surface heights between adjacent cells so that water from the water inundation events likely flows to adjacent cells, as described herein.

After updating the surface water indicators in block 155, the land flow estimator 22 calculates the amount of water that flows into and out of each land cell 61-69 and 91-94. In this regard, the land flow estimator 22 selects a land cell 61-69 and 91-94 that has yet to be analyzed for the current time step, as shown by block 158 of FIG. 16. The land flow estimator 22 then calculates the amount of water that flows into and out of the selected land cell, as shown by block 163. As described above, such calculation may be based on many factors, such as the respective water surface heights of the selected cell and adjacent cells. The calculations may also be based on the analysis and/or comparisons of other terrain parameters. Based on the calculations in block 163, the land flow estimator 22 updates the terrain parameters of the selected cell and each cell affected by the calculations, as shown by block 166. As an example, if the land flow estimator 22 determines that water virtually flows from the selected cell to an adjacent cell, then the land flow estimator 22 updates the terrain parameters of the selected cell and the adjacent cell to account for the flow of water out of the selected cell and into the adjacent cell. On the other hand, if the land flow estimator 22 determines that water virtually flows from an adjacent cell to the selected cell, then the land flow estimator 22 updates the terrain parameters of the selected cell and the adjacent cell to account for the flow of water out of the adjacent cell and into the selected cell. As described herein, there may be multiple flows of water into and/or out of the selected cell such that the overall change to the terrain parameters is not based on a single flow.

As described above, the land flow estimator 22 may determine that water flows from any land cell 61-69 and 91-94 into a channel cell 81-84. The land flow estimator 22 provides to the channel flow estimator 25 data indicative of the amount of water determined to flow into any channel cell 81-84 based on the calculations in block 163, as shown by block 171.

After selecting and analyzing a land cell for the current time step, in blocks 155 and 163, respectively, the land flow estimator 22 determines whether all land cells have been selected via block 155 and analyzed via block 163, as shown by block 175. If not, the land flow estimator 22 returns to block 155 and selects a new land cell for the current time step (i.e., a land cell that has yet to be selected in block 155 and analyzed in block 163 for the current time step). Once all of the land cells have been selected and analyzed for the current time step, the land flow estimator 22 returns to block 152 to receive the inundation data for the next time step.

An exemplary operation and use of the channel flow estimator 25 will now be described with particular reference to FIG. 17.

Figure 17:
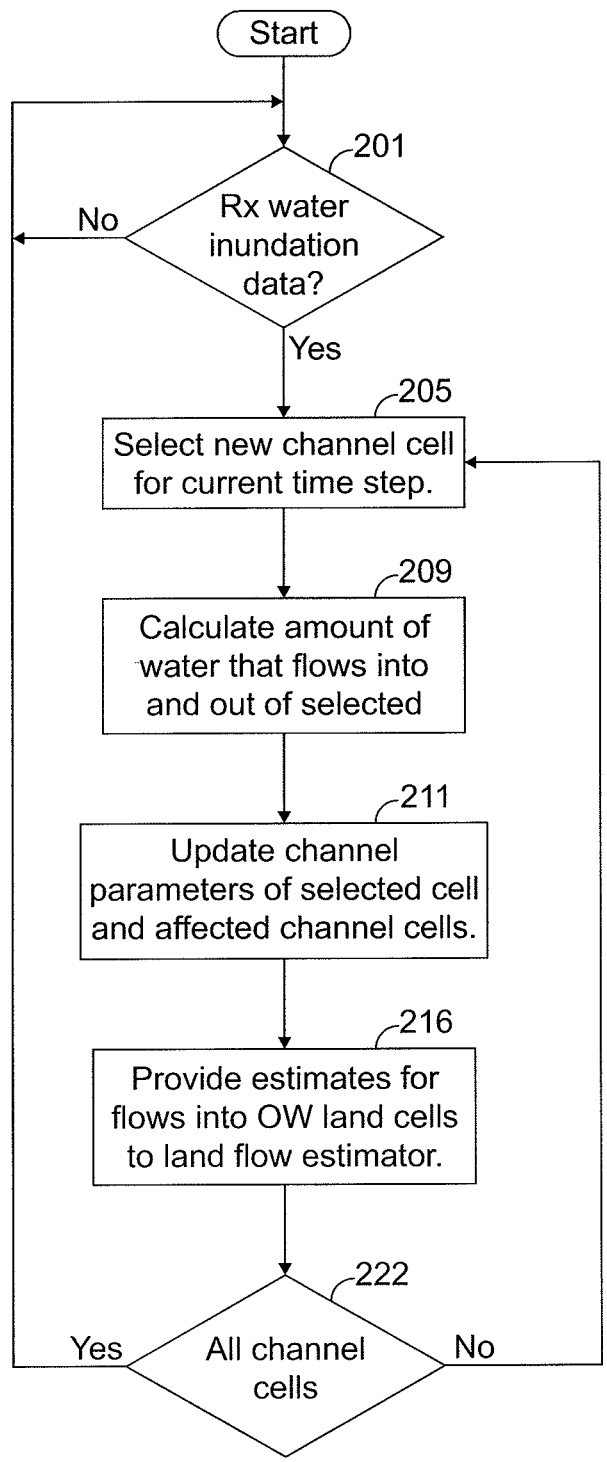
FIG. 17 is a flow chart illustrating an exemplary operation of a channel flow estimator, such as is depicted in FIG. 1.
Figure 18:
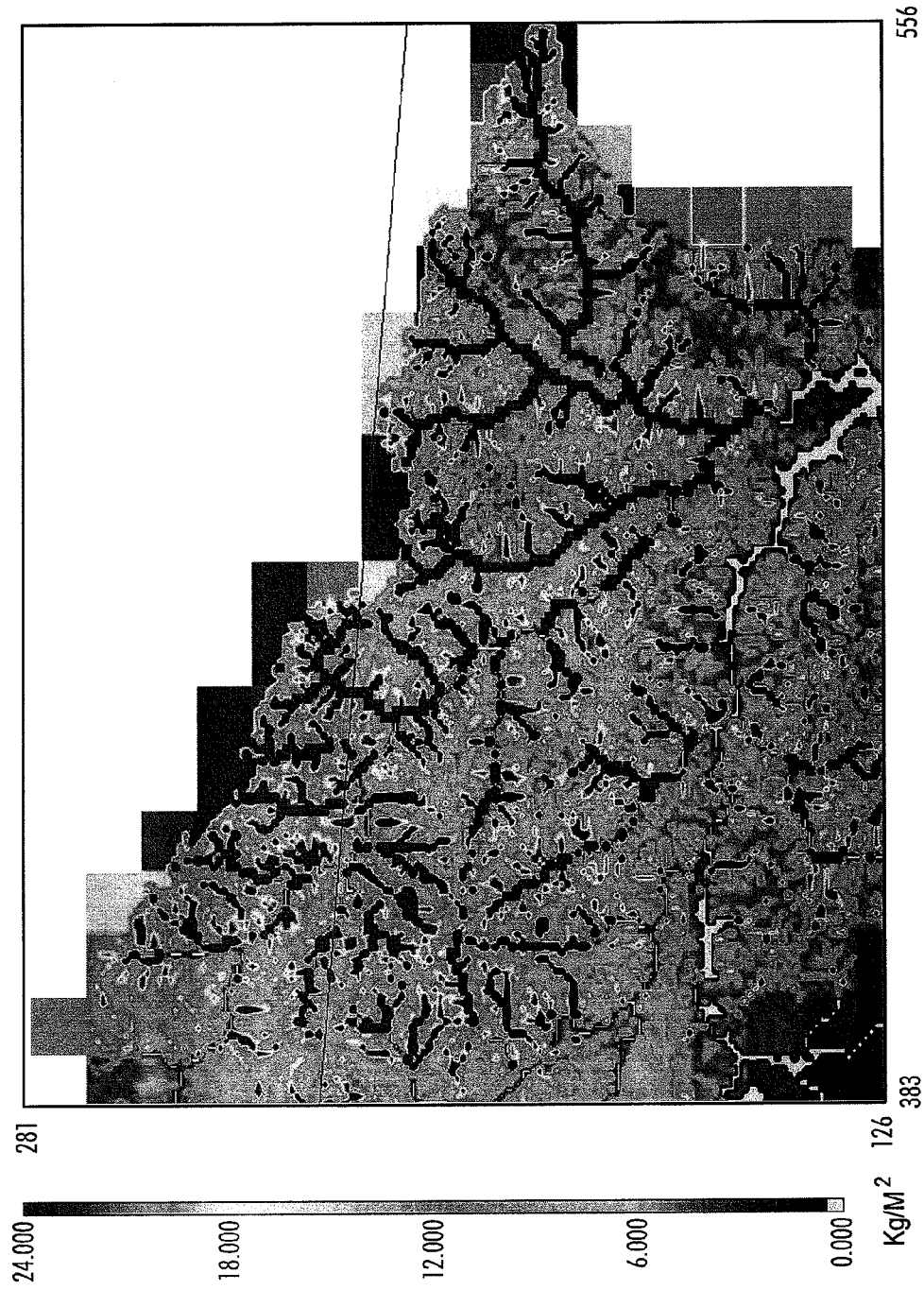
FIG. 18 depicts an inundation map showing color coded flood levels based on data provided by a flood modeling system, such as is depicted in FIG. 1.

As shown by block 201 of FIG. 17, the channel flow estimator 25 determines when it has received the estimates for flows into the channel cells 81-84 from the land flow estimator 22 and/or other source. When such estimates are received, the channel flow estimator 25 calculates the amount of water that flows into and out of each channel cell 81-84. In this regard, the channel flow estimator 25 selects a channel cell 81-84 that has yet to be analyzed for the current time step, as shown by block 205 of FIG. 17. The channel flow estimator 25 then calculates the amount of water that flows into and out of the selected channel cell, as shown by block 209. As described above, such calculation may be based on many factors, such as the respective floor heights of the selected cell and adjacent cells and the channel flow resistance indicator of the selected channel cell. Based on the calculations in block 209, the channel flow estimator 25 updates the channel parameters of the selected cell and each cell affected by the calculations, as shown by block 211. As described herein, there may be multiple flows of water into and/or out of the selected cell such that the overall change to the channel parameters is not based on a single flow.

As described above, the channel flow estimator 25 may determine that water flows from any channel cell 81-84 to an OW land cell 91-94. The channel flow estimator 25 provides to the land flow estimator 22 data indicative of the amount of water determined to flow into any OW land cell 91-94 based on the calculations in block 209, as shown by block 216. Such data forms part of the inundation water data received by the land flow estimator 22 for the next time step and which is used to adjust the surface water indicators in block 155 of FIG. 16.

After selecting and analyzing a channel cell for the current time step, in blocks 205 and 209, respectively, the channel flow estimator 25 determines whether all channel cells have been selected via block 205 and analyzed via block 209, as shown by block 222. If not, the channel flow estimator 25 returns to block 205 and selects a new channel cell for the current time step (i.e., a channel cell that has yet to be selected in block 205 and analyzed in block 209 for the current time step). Once all of the channel cells have been selected and analyzed for the current time step, the channel flow estimator 25 returns to block 201 to wait for the flow estimates for the next time step.

Now, therefore, the following is claimed:

1. A flood modeling system, comprising:
   memory for storing terrain data, the terrain data defining a plurality of land cells and a plurality of channel cells, the land cells representing areas of terrain within a geographic region, the channel cells representing areas of a channel passing through the geographic region, wherein the terrain data defines at least one overwater (OW) land cell representing an area over one of the channel cells;

a land flow estimator configured to model a flood in the geographic region in a series of time steps and to respectively associate the plurality of land cells with surface water indicators, each of the surface water indicators indicative of an amount of surface water virtually in the associated land cell, wherein for each of the time steps the land flow estimator calculates an amount of surface water that virtually flows to each respective land cell and an amount of surface water that virtually flows from each respective land cell, wherein the land flow estimator, for each of the time steps and each of the plurality of land cells, updates the associated surface water indicator based on the amount of surface water calculated to virtually flow to the respective land cell during the respective time step and the amount of surface water calculated to virtually flow from the respective land cell during the respective time step, wherein the plurality of land cells include at least a first land cell and a second land cell that is adjacent to the first land cell, and wherein the land flow estimator is configured to calculate an amount of surface water that flows from the first land cell to the second land cell for one of the time steps based on the surface water indicators associated with the first and second land cells; and a channel flow estimator configured to calculate, for each of the time steps and each of the channel cells, an amount of water that virtually flows to each respective channel cell and an amount of water that virtually flows from each respective channel cell, the channel flow estimator further configured to respectively associate the channel cells with channel water indicators, each of the channel water indicators indicative of an amount of water virtually in the associated channel cell, wherein the channel flow estimator, for each of the time steps and each of the channel cells, updates the associated channel water indicator based on the amount of water calculated to virtually flow to the respective channel cell during the respective time step and the amount of water calculated to virtually flow from the respective channel cell curing the respective time step, the channel flow estimator configured to calculate an amount of overflow water that virtually overflows one of the channel cells to the OW land cell for one of the time steps based on a water surface height associated with the one channel cell, wherein the land flow estimator is configured to associate the OW land cell with a surface water indicator indicative of an amount of surface water virtually in the OW land cell above the one channel cell, wherein the land flow estimator is configured to calculate an amount of water that virtually flows from the OW land cell to the first land cell based on the surface water indicator associated with the first land cell and the surface water indicator associated with the OW land cell, and wherein the first land cell is adjacent to the OW land cell.

2. The system of claim 1, wherein the land flow estimator is configured to determine, for each of the time steps and each of the plurality of land cells, an amount of surface water that virtually absorbs underground for the respective land cell.

3. The system of claim 1, wherein the land flow estimator is configured to calculate, for each of the time steps and each of the plurality of land cells, an amount of subterranean water that virtually flows underground to the respective land cell and an amount of subterranean water that virtually flows underground from the respective land cell.

4. The system of claim 1, wherein the land flow estimator is configured to respectively associate absorption indicators with the plurality of land cells, each of the absorption indicators indicative of a rate that water virtually absorbs underground for the associated land cell.

5. The system of claim 4, wherein the land flow estimator is configured to associate an absorption indicator with the OW land cell, and wherein the absorption indicator associated with the OW land cell indicates a rate that water virtually flows from the OW land cell to the one channel cell.

6. The system of claim 5, wherein the absorption indicator associated with the OW land cell is based on the channel water indicator associated with the one channel cell.

7. The system of claim 1, wherein the land flow estimator is configured to calculate an amount of subterranean water that virtually flows underground from the first land cell to the second land cell.

8. The system of claim 7, wherein the land flow estimator is configured to calculate the amount of subterranean water that virtually flows underground based on a subterranean resistance indicator for the first land cell.

9. The system of claim 7, wherein the amount of subterranean water that is calculated to virtually flow from the first land cell to the second land cell is based on an absorption indicator associated with the first land cell, the absorption indicator indicating a rate that water virtually absorbs from a surface to underground for the first land cell, and wherein the absorption indicator is based on a saturation indicator associated with the first land cell, the saturation indicator indicative of an amount of ground saturation for the first land cell.

10. The system of claim 7, wherein the land flow estimator is configured to update an absorption indicator associated with the second land cell based on the amount of subterranean water calculated to virtually flow underground from the first land cell to the second land cell, the absorption indicator indicating a rate that water virtually absorbs from a surface to underground for the second land cell.

11. The system of claim 1, wherein the land flow estimator is configured to calculate an amount of subterranean water that virtually flows underground from the first land cell to the one channel cell.

12. A flood modeling system, comprising:

memory for storing terrain data, the terrain data defining a plurality of land cells and a plurality of channel cells, the land cells representing areas of terrain within a geographic region, the channel cells representing areas of a channel passing through the geographic region;

a land flow estimator configured to model a flood in the geographic region in a series of time steps and to respectively associate the plurality of land cells with surface water indicators, each of the surface water indicators indicative of an amount of surface water virtually in the associated land cell, wherein the land flow estimator is configured to calculate, for each of the time steps, virtual flows of water between the plurality of land cells based on a land flow algorithm and to update the surface water indicators based on the flows calculated by the land flow estimator; and a channel flow estimator configured to respectively associate the channel cells with channel water indicators, each of the channel water indicators indicative of an amount of water virtually in the associated channel cell, wherein the channel flow estimator is configured to calculate, for each of the time steps, virtual flows of water between the channel cells based on the channel flow algorithm and to update the channel flow indicators based on the flows calculated by the channel flow estimator, wherein the land flow estimator is configured to provide, for each of the time steps, the channel flow estimator with first data indicative of virtual flows of water from the plurality of land cells to the channel cells, and wherein the channel flow estimator is configured to provide, for each of the time steps, the land flow estimator with second data indicative of virtual overflows of water from the channel cells, wherein the first data is based on the land flow algorithm and the second data is based on the channel flow algorithm, wherein the terrain data defines at least one overwater (OW) land cell representing an area over one of the channel cells, wherein water that virtually overflows the one channel cell virtually flows to the OW land cell, wherein the land flow estimator is configured to associate the OW land cell with a surface water indicator indicative of an amount of surface water virtually in the OW land cell above the one channel cell, and wherein the land flow estimator is configured to calculate an amount of water that virtually flows from the OW land cell to an adjacent one of the plurality of land cells based on the land flow algorithm and the surface water indicators associated with the OW land cell and the adjacent land cell.

13. The system of claim 12, wherein the land flow estimator is configured to determine, for each of the time steps and each of the plurality of land cells, an amount of surface water that virtually absorbs underground for the respective land cell.

14. The system of claim 12, wherein the land flow estimator is configured to calculate, for each of the time steps and each of the plurality of land cells, an amount of subterranean water that virtually flows underground to the respective land cell and an amount of subterranean water that virtually flows underground from the respective land cell.

15. The system of claim 12, wherein the land flow estimator is configured to respectively associate absorption indicators with the plurality of land cells, each of the absorption indicators indicative of a rate that water virtually absorbs underground for the associated land cell.

16. The system of claim 15, wherein the land flow estimator is configured to associate an absorption indicator with the OW land cell, and wherein the absorption indicator associated with the OW land cell indicates a rate that water virtually flows from the OW land cell to the one channel cell.

17. The system of claim 16, wherein the absorption indicator associated with the OW land cell is based on the channel water indicator associated with the one channel cell.

18. The system of claim 12, wherein the land flow estimator is configured to control an absorption indicator associated with the OW land cell based on the channel water indicator associated with the one channel cell.

19. A flood modeling method, comprising:
storing terrain data in memory, the terrain data defining a plurality of land cells and a plurality of channel cells, the land cells representing areas of terrain within a geographic region, the channel cells representing areas of a channel passing through the geographic region, wherein the terrain data defines at least one overwater (OW) land cell representing an area over one of the channel cells;
modeling a flood in the geographic region in a series of time steps;
respectively associating the plurality of land cells with surface water indicators, each of the surface water indicators indicative of an amount of surface water virtually in the associated land cell;
for each of the time steps, calculating an amount of surface water that virtually flows to each respective land cell and an amount of surface water that virtually flows from each respective land cell;
for each of the time steps and each of the plurality of land cells, updating the associated surface water indicator based on the amount of surface water calculated to virtually flow to the respective land cell during the respective time step and the amount of surface water calculated via the calculating to virtually flow from the respective land cell during the respective time step;
for each of the time steps and each of the channel cells, calculating an amount of water that virtually flows to each respective channel cell and an amount of water that virtually flows from each respective channel cell;
respectively associating the channel cells with channel water indicators, each of the channel water indicators indicative of an amount of water virtually in the associated channel cell; and
for each of the time steps and each of the channel cells, updating the associated channel water indicator based on the amount of water calculated to virtually flow to the respective channel cell during the respective time step and the amount of water calculated to virtually flow from the respective channel cell during the respective time step;
associating the OW land cell with a surface water indicator indicative of an amount of surface water virtually in the OW land cell above the one channel cell;
calculating an amount of water that virtually overflows the one channel cell to the OW land cell;
comparing the surface water indicator associated with the OW land cell and the surface water indicator associated with at least one of the plurality of land cells adjacent to the OW land cell cell; and
calculating an amount of water that virtually flows from the OW land cell to the adjacent land cell based on the comparing.

20. The method of claim 19, further comprising determining, for each of the time steps and each of the plurality of land cells, an amount of surface water that virtually absorbs underground for the respective land cell.

21. The method of claim 20, further comprising associating an absorption indicator with the OW land cell, wherein the absorption indicator associated with the OW land cell indicates a rate that water virtually flows from the OW land cell to the one channel cell.

22. The method of claim 21, wherein the absorption indicator associated with the OW land cell is based on the channel water indicator associated with the one channel cell.

23. The method of claim 19, further comprising calculating, for each of the time steps and each of the plurality of land cells, an amount of subterranean water that virtually flows underground to the respective land cell and an amount of subterranean water that virtually flows underground from the respective land cell.

24. The method of claim 19, further comprising respectively associating absorption indicators with the plurality of land cells, each of the absorption indicators indicative of a rate that water virtually absorbs underground for the associated land cell.

25. The method of claim 19, further comprising displaying a flood inundation map based on the plurality of land cells.

26. The method of claim 19, further comprising generating a flood warning based on the plurality of land cells.

\* \* \* \* \*